(12) United States Patent
Saito

(10) Patent No.: US 10,047,290 B2
(45) Date of Patent: Aug. 14, 2018

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventor: Masayuki Saito, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 0 days.

(21) Appl. No.: 15/424,494

(22) Filed: Feb. 3, 2017

(65) Prior Publication Data

US 2017/0226423 A1    Aug. 10, 2017

(30) Foreign Application Priority Data

Feb. 5, 2016   (JP) ................... 2016-020380
Aug. 31, 2016  (JP) ................... 2016-168741

(51) Int. Cl.
| | | |
|---|---|---|
| G02F 1/1333 | (2006.01) | |
| C09K 19/30 | (2006.01) | |
| C09K 19/34 | (2006.01) | |
| C09K 19/04 | (2006.01) | |
| C09K 19/12 | (2006.01) | |
| G02F 1/137 | (2006.01) | |

(52) U.S. Cl.
CPC ...... C09K 19/3066 (2013.01); C09K 19/3098 (2013.01); *C09K 2019/0444* (2013.01); *C09K 2019/0448* (2013.01); *C09K 2019/122* (2013.01); *C09K 2019/123* (2013.01); *C09K 2019/301* (2013.01); *C09K 2019/3021* (2013.01); *C09K 2019/3027* (2013.01); *C09K 2019/3422* (2013.01); *G02F 2001/13712* (2013.01); *G02F 2202/022* (2013.01)

(58) Field of Classification Search
CPC ............ C09K 19/3066; C09K 19/3098; C09K 2019/3422; C09K 2019/0444; C09K 2019/0448; C09K 2019/122; C09K 2019/123; C09K 2019/301; C09K 2019/3021; C09K 2019/3027; G02F 1/1333; G02F 2001/13712; G02F 2202/022
USPC ........................................ 252/299.5; 349/183
See application file for complete search history.

(56) References Cited

U.S. PATENT DOCUMENTS

| | | | |
|---|---|---|---|
| 6,861,107 B2 * | 3/2005 | Klasen-Memmer | C09K 19/42 252/299.01 |
| 9,637,578 B2 * | 5/2017 | Gotoh | C08F 122/20 |
| 2004/0011996 A1 | 1/2004 | Klasen-Memmer et al. | |
| 2005/0116200 A1 | 6/2005 | Nakanishi et al. | |

FOREIGN PATENT DOCUMENTS

| | | |
|---|---|---|
| EP | 1 889 894 A | 2/2008 |
| EP | 1 889 894 A1 | 2/2008 |
| JP | 2003-307720 A | 10/2003 |
| JP | 2004-131704 A | 4/2004 |

* cited by examiner

*Primary Examiner* — Geraldina Visconti
(74) *Attorney, Agent, or Firm* — Foley & Lardner LLP

(57) ABSTRACT

Provided is a liquid crystal composition satisfying at least one of characteristics such as a high maximum temperature, a low minimum temperature, small viscosity, suitable optical anisotropy, large negative dielectric anisotropy, large specific resistance, high stability to ultraviolet light and high stability to heat, or has a suitable balance regarding at least two of the characteristics; and an AM device including the composition and having a short response time, a large voltage holding ratio, a low threshold voltage, a large contrast ratio or a long service life. The composition contains a specific compound having at least one polymerizable group, and a liquid crystal display device includes the composition. The composition may contain a specific compound having large negative dielectric anisotropy as a first component, and a specific compound having a high maximum temperature or small viscosity as a second component.

20 Claims, No Drawings

LIQUID CRYSTAL COMPOSITION AND LIQUID CRYSTAL DISPLAY DEVICE

TECHNICAL FIELD

The invention relates to a liquid crystal composition, a liquid crystal display device including the composition, and so forth. In particular, the invention relates to a liquid crystal composition having a negative dielectric anisotropy, and a liquid crystal display device that includes the composition and has a mode such as an IPS mode, a VA mode, an FFS mode and an FPA mode. The invention also relates to a liquid crystal display device having a polymer sustained alignment mode.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth. The AM is classified into a thin film transistor (TFT), a metal insulator metal (MIM) and so forth. The TFT is classified into amorphous silicon and polycrystal silicon based on a material. The latter is further classified into a high temperature type and a low temperature type based on a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving characteristics of the composition. Table 1 below summarizes a relationship in two characteristics. The characteristics of the composition will be further described based on a commercially available AM device. A temperature range of the nematic phase relates to a temperature range in which the device can be used. A preferred maximum temperature of the nematic phase is about 70° C. or higher, and a preferred minimum temperature of the nematic phase is about −10° C. or lower. Viscosity of the composition relates to a response time of the device. A short response time is preferred for displaying moving images on the device. A shorter response time even by one millisecond is desirable. Accordingly, a small viscosity in the composition is preferred. A small viscosity at a low temperature is further preferred.

TABLE 1

Characteristics of Composition and AM Device

| No. | Characteristics of Composition | Characteristics of AM Device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |

An optical anisotropy of the composition relates to a contrast ratio in the device. According to a mode of the device, a large optical anisotropy or a small optical anisotropy, more specifically, a suitable optical anisotropy is required. A product ($\Delta n \times d$) of the optical anisotropy ($\Delta n$) of the composition and a cell gap (d) in the device is designed so as to maximize the contrast ratio. A suitable value of the product depends on a type of the operating mode. In a device having the VA mode, the suitable value is in the range of about 0.30 micrometer to about 0.40 micrometer, and in a device having the IPS mode or the FFS mode, the suitable value is in the range of about 0.20 micrometer to about 0.30 micrometer. In the above cases, a composition having the large optical anisotropy is preferred for a device having a small cell gap. A large dielectric anisotropy in the composition contributes to a low threshold voltage, a small electric power consumption and a large contrast ratio in the device. Accordingly, the large dielectric anisotropy is preferred. A large specific resistance in the composition contributes to a large voltage holding ratio and the large contrast ratio in the device. Accordingly, a composition having the large specific resistance at room temperature and also at a temperature close to the maximum temperature of the nematic phase in an initial stage is preferred. The composition having the large specific resistance at room temperature and also at a temperature close to the maximum temperature of the nematic phase even after the device has been used for a long period of time is preferred. Stability of the composition to ultraviolet light and heat relates to a service life of the device. In the case where the stability is high, the device has a long service life. Such characteristics are preferred for an AM device used in a liquid crystal projector, a liquid crystal television and so forth.

In a liquid crystal display device having a polymer sustained alignment (PSA) mode, a liquid crystal composition containing a polymer is used. First, a composition to which a small amount of a polymerizable compound is added is injected into the device. Then, the composition is irradiated with ultraviolet light while voltage is applied between substrates of the device. The polymerizable compound is polymerized to form a network structure of the polymer in the composition. In the composition, alignment of liquid crystal molecules can be controlled by the polymer, and therefore a response time of the device is shortened and also image persistence is improved. Such an effect of the polymer can be expected for a device having the mode such as the TN mode, the ECB mode, the OCB mode, the IPS mode, the VA mode, the FFS mode and the FPA mode.

A composition having a positive dielectric anisotropy is used in an AM device having the TN mode. A composition having a negative dielectric anisotropy is used in an AM device having the VA mode. In the AM device having the IPS mode, the FFS mode or the FPA mode, a composition having a positive or negative dielectric anisotropy is used.

Examples of the compositions for the device having the polymer sustained alignment mode are disclosed in Patent literature Nos. 1 to 3.

CITATION LIST

Patent Literature

Patent literature No. 1: JP 2003-307720 A.
Patent literature No. 2: JP 2004-131704 A.
Patent literature No. 3: EP 1889894 A.

SUMMARY OF INVENTION

Technical Problem

One of aims of the invention is to provide a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. Another aim is to provide a liquid crystal composition having a suitable balance regarding at least two of the characteristics. Another aim is to provide a liquid crystal display device including such a composition. Another aim is to provide an AM device having characteristics such as a short response time, a large voltage holding ratio, a low threshold voltage, a large contrast ratio and a long service life.

Solution to Problem

The invention concerns a liquid crystal composition that has a negative dielectric anisotropy and contains at least one polymerizable compound selected from the group of compounds represented by formula (1):

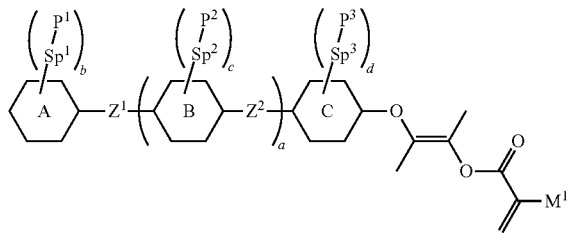

wherein, in formula (1), ring A is cyclohexyl, cyclohexenyl, phenyl, 1-naphthyl, 2-naphthyl, tetrahydropyran-2-yl, 1,3-dioxane 2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring B and ring C are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^1$ and $Z^2$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH=CH—, —C($CH_3$)=CH—, —CH=C($CH_3$)— or —C($CH_3$)=C($CH_3$)—, and in the groups, at least one piece of hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or —C≡C—, and in the groups, at least one piece of hydrogen may be replaced by fluorine or chlorine; $M^1$ is hydrogen or methyl; a is 0, 1 or 2; and b, c and d are independently 0, 1, 2, 3 or 4.

Advantageous Effects of Invention

An advantage of the invention is a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. Another advantage is a liquid crystal composition having a suitable balance regarding at least two of the characteristics. Another advantage is a liquid crystal display device including such a composition. Another advantage is an AM device having characteristics such as a short response time, a large voltage holding ratio, a low threshold voltage, a large contrast ratio and a long service life.

DESCRIPTION OF EMBODIMENTS

Usage of terms herein is as described below. Terms "liquid crystal composition" and "liquid crystal display device" may be occasionally abbreviated as "composition" and "device," respectively. "Liquid crystal display device" is a generic term for a liquid crystal display panel and a liquid crystal display module. "Liquid crystal compound" is a generic term for a compound having a liquid crystal phase such as a nematic phase and a smectic phase, and a compound having no liquid crystal phase but to be mixed with a composition for the purpose of adjusting characteristics such as a temperature range of the nematic phase, viscosity and a dielectric anisotropy. The compound has a six-membered ring such as 1,4-cyclohexylene and 1,4-phenylene, and has rod-like molecular structure. "Polymerizable compound" is a compound to be added for the purpose of forming a polymer in the composition.

The liquid crystal composition is prepared by mixing a plurality of liquid crystal compounds. An additive such as an optically active compound, an antioxidant, an ultraviolet light absorber, a dye, an antifoaming agent, the polymerizable compound, a polymerization initiator, a polymerization inhibitor and a polar compound is added to the liquid crystal composition when necessary. The liquid crystal compound and the additive are mixed in such a procedure. A proportion (content) of the liquid crystal compounds is expressed in terms of weight percent (% by weight) based on the weight of the liquid crystal composition containing no additive, even after the additive has been added. A proportion (amount of addition) of the additive is expressed in terms of weight percent (% by weight) based on the weight of the liquid crystal composition containing no additive. More specifically, a proportion of the liquid crystal compound or the additive is calculated based on the total weight of the liquid crystal compounds. Weight parts per million (ppm) may be occasionally used. A proportion of the polymerization initiator and the polymerization inhibitor is exceptionally expressed based on the weight of the polymerizable compound.

"Maximum temperature of the nematic phase" may be occasionally abbreviated as "maximum temperature." "Minimum temperature of the nematic phase" may be occasionally abbreviated as "minimum temperature." An expression "having a large specific resistance" means that the composition has a large specific resistance at room temperature and also at a temperature close to the maximum temperature in an initial stage, and the composition has the large specific resistance at room temperature and also at a temperature close to the maximum temperature even after the device has been used for a long period of time. An expression "having a large voltage holding ratio" means that the device has a large voltage holding ratio at room temperature and also at a temperature close to the maximum temperature in the initial stage, and the device has the large voltage holding ratio at room temperature and also at a temperature close to the maximum temperature even after the device has been used for the long period of time. In the composition or the device, the characteristics may be occasionally examined before and after an aging test (including an acceleration deterioration test). An expression "increase the dielectric anisotropy" means that a value of dielectric anisotropy positively increases in a liquid crystal composition having a positive dielectric anisotropy, and the value of dielectric anisotropy negatively increases in a liquid crystal composition having a negative dielectric anisotropy.

A compound represented by formula (1) may be occasionally abbreviated as "compound (1)." At least one compound selected from the group of compounds represented by formula (1) may be occasionally abbreviated as "compound (1)." "Compound (1)" means one compound, a mixture of two compounds or a mixture of three or more compounds represented by formula (1). A same rule applies also to any other compound represented by any other formula. An expression "at least one piece of 'A'" means that the number of 'A' is arbitrary. An expression "at least one piece of 'A' may be replaced by 'B'" means that, when the number of 'A' is 1, a position of 'A' is arbitrary, and also when the number of 'A' is 2 or more, positions thereof can be selected without restriction. A same rule applies also to an expression "at least one piece of 'A' is replaced by 'B'."

A symbol of terminal group $R^1$ is used in a plurality of compounds in chemical formulas of component compounds. In the compounds, two groups represented by two pieces of arbitrary $R^1$ may be identical or different. In one case, for example, $R^1$ of compound (2-1) is ethyl and $R^1$ of compound (2-2) is ethyl. In another case, $R^1$ of compound (2-1) is ethyl and $R^1$ of compound (2-2) is propyl. A same rule applies also to a symbol of any other terminal group or the like. In formula (3), when f is 2, two of rings F exists. In the compound, two rings represented by two of rings F may be identical or different. A same rule applies also to two of arbitrary rings F when f is larger than 2. A same rule applies also to a symbol of $Z^2$, ring B or the like. A same rule applies also to such a case where two pieces of $-Sp^5-P^{11}$ exists in compound (4-27).

Symbols A, B, C or the like surrounded by a hexagonal shape correspond to six-membered rings such as ring A, ring B and ring C, respectively. In compound (1), a hexagon shape represents a six-membered ring or a condensed ring. An oblique line crossing the hexagonal shape represents that arbitrary hydrogen on the ring may be replaced by $-Sp^1-P^1$ group or the like. A subscript such as b represents the number of groups to be replaced. When the subscript is 0, no such replacement exists. When b is 2 or more, a plurality of pieces of $-Sp^1-P^1$ exist on ring A. The plurality of groups represented by $-Sp^1-P^1$ may be identical or different.

Then, 2-fluoro-1,4-phenylene means two divalent groups described below. In a chemical formula, fluorine may be leftward (L) or rightward (R). A same rule applies also to an asymmetrical divalent group derived from a ring such as tetrahydropyran-2,5-diyl. A same rule applies also to a divalent bonding group such as carbonyloxy (—COO— or —OCO—).

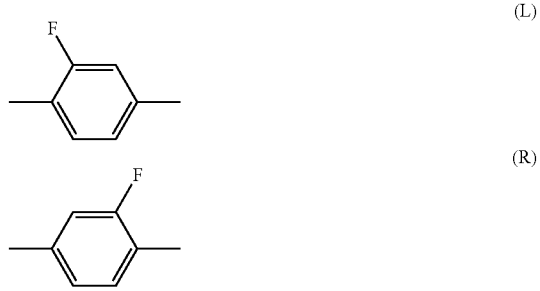

The invention includes items described below.

Item 1. A liquid crystal composition that has a negative dielectric anisotropy, and contains at least one polymerizable compound selected from the group of compounds represented by formula (1):

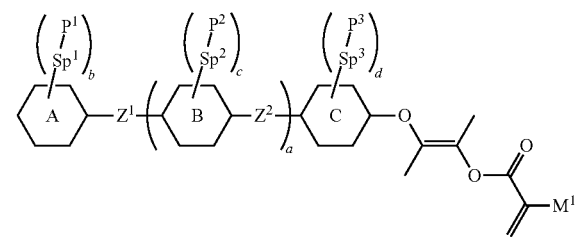

wherein, in formula (1), ring A is cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring B and ring C are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^1$ and $Z^2$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH=CH—, —C($CH_3$)=CH—, —CH=C($CH_3$)— or —C($CH_3$)=C($CH_3$)—, and in the groups, at least one piece of hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or —C≡C—, and in the groups, at least one piece of hydrogen may be replaced by fluorine or chlorine; $M^1$ is hydrogen or methyl; a is 0, 1 or 2; and b, c and d are independently 0, 1, 2, 3 or 4.

Item 2. The liquid crystal composition according to item 1, wherein, in formula (1), $P^1$, $P^2$ and $P^3$ are independently a polymerizable group selected from the group of groups represented by formula (P-1) to formula (P-5):

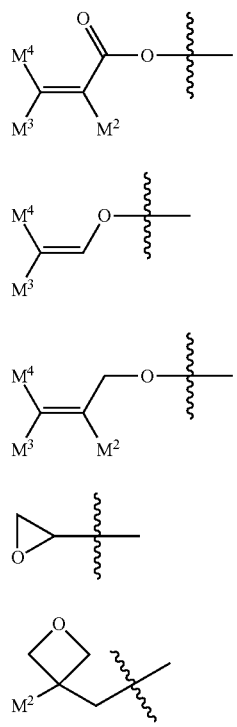

wherein, in formula (P-1) to formula (P-5), $M^2$, $M^3$ and $M^4$ are independently hydrogen, fluorine, alkyl having 1 to 5 carbons, or alkyl having 1 to 5 carbons in which at least one piece of hydrogen is replaced by fluorine or chlorine.

Item 3. The liquid crystal composition according to item 1 or 2, containing at least one polymerizable compound selected from the group of compounds represented by formula (1-1) to formula (1-27):

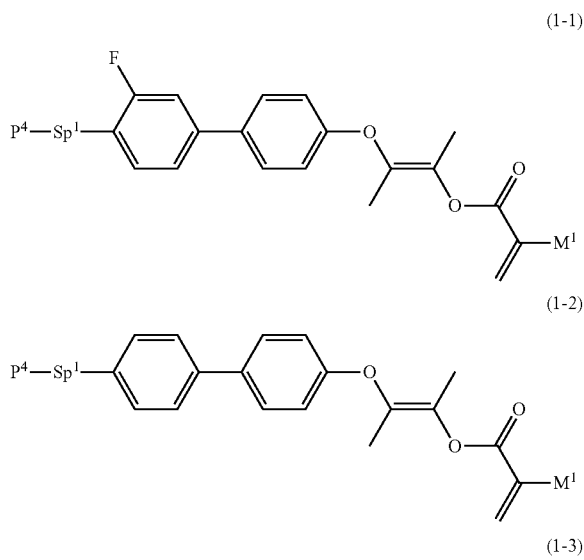

(1-1)

(1-2)

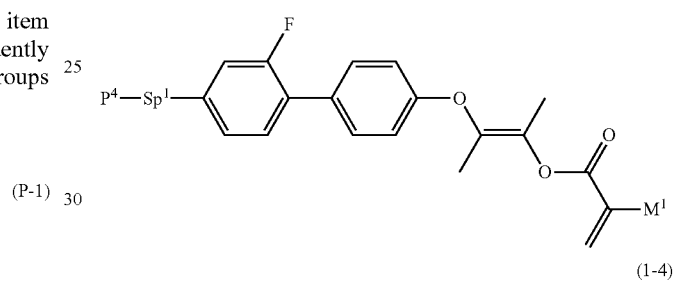

(1-3)

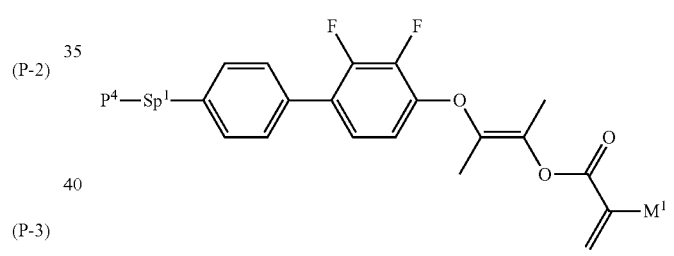

(1-4)

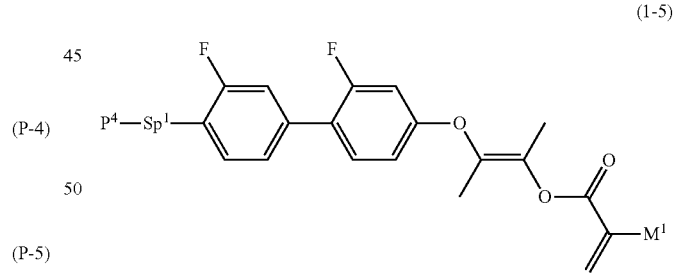

(1-5)

(1-6)

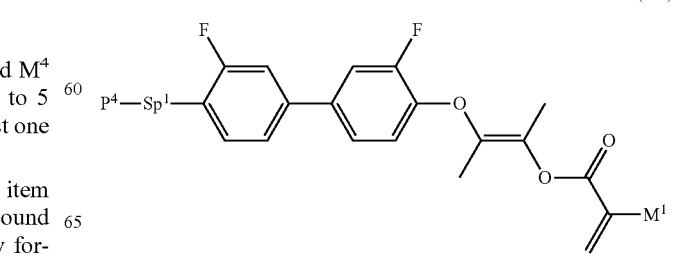

(1-7)
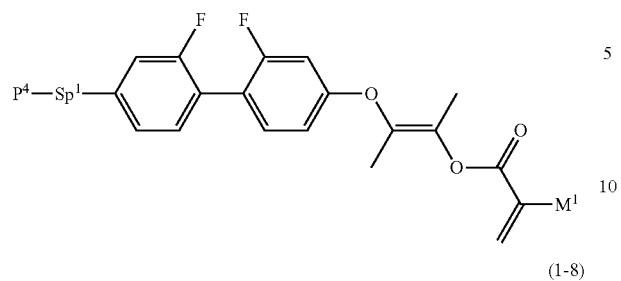
(1-8)
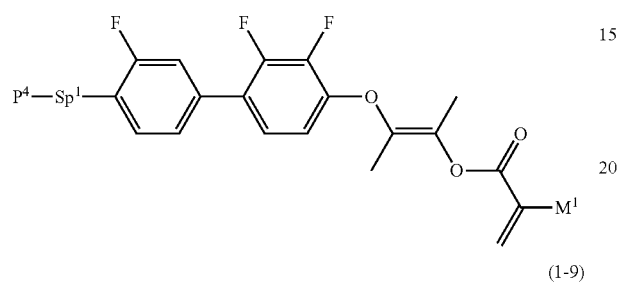
(1-9)
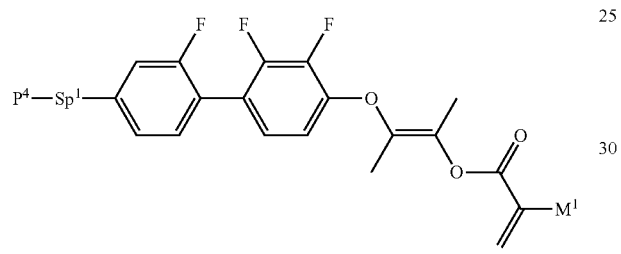
(1-10)
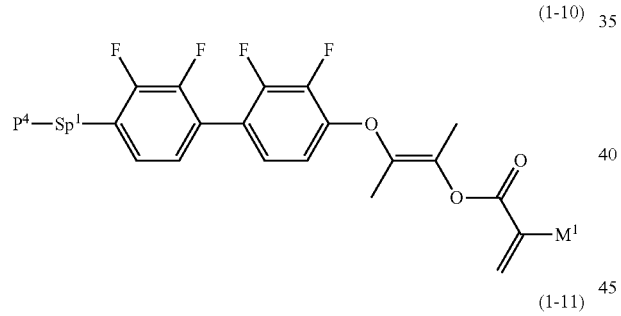
(1-11)
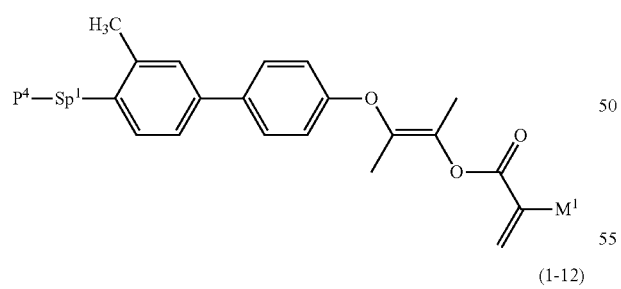
(1-12)
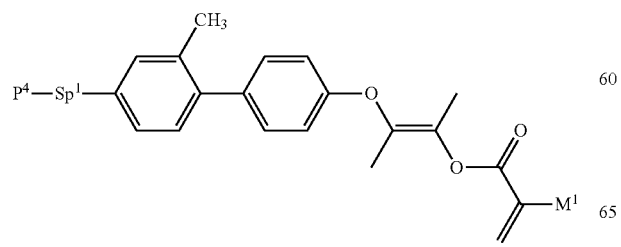
(1-13)
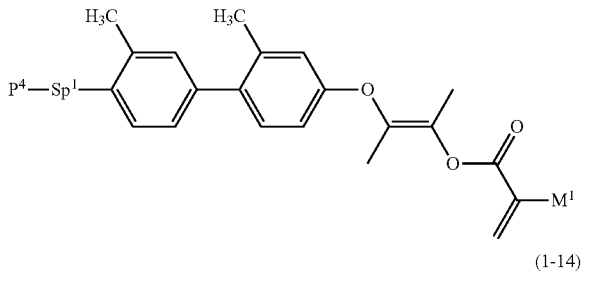
(1-14)
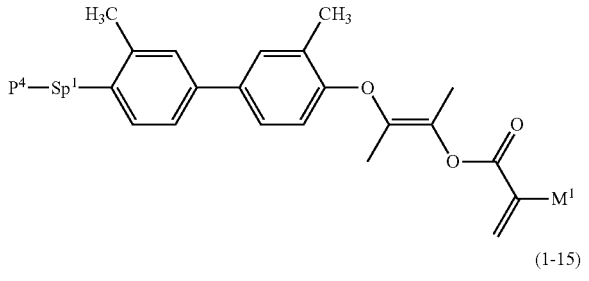
(1-15)
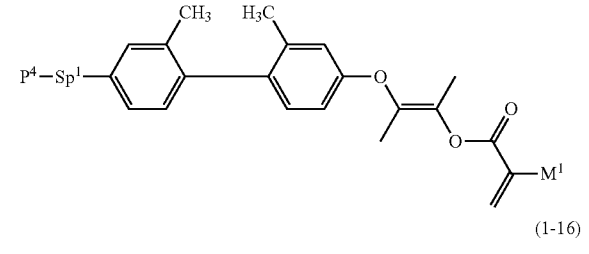
(1-16)
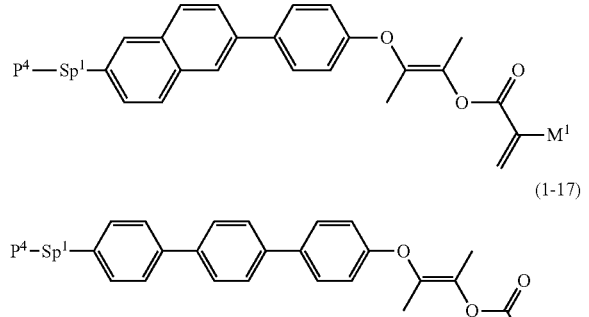
(1-17)
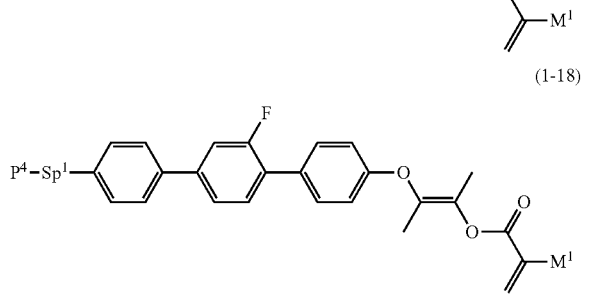
(1-18)
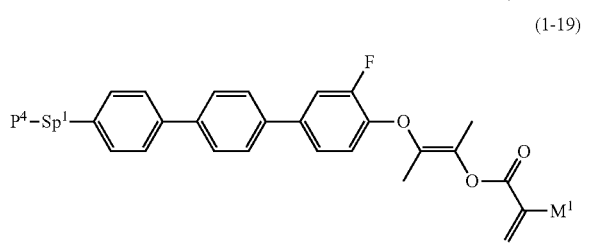
(1-19)

(1-20)
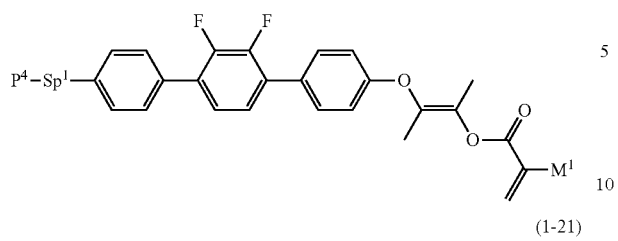

(1-21)
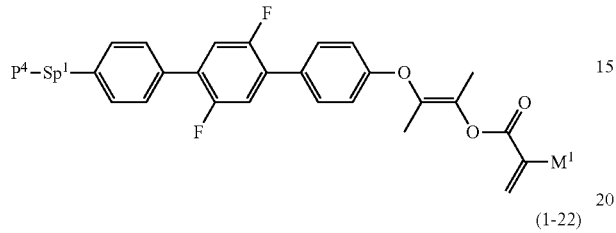

(1-22)
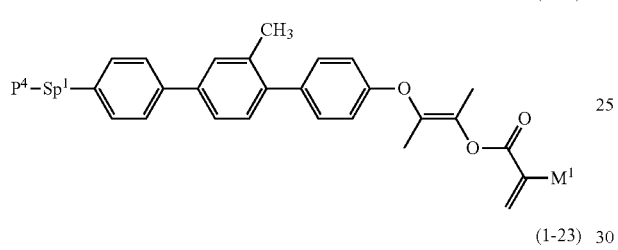

(1-23)
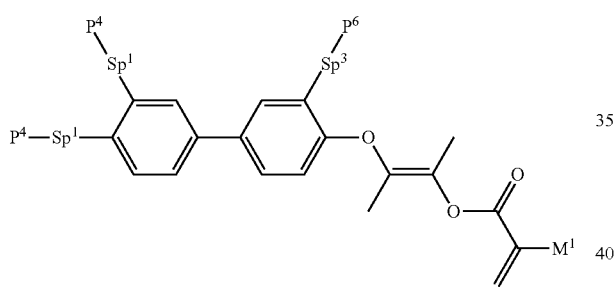

(1-24)
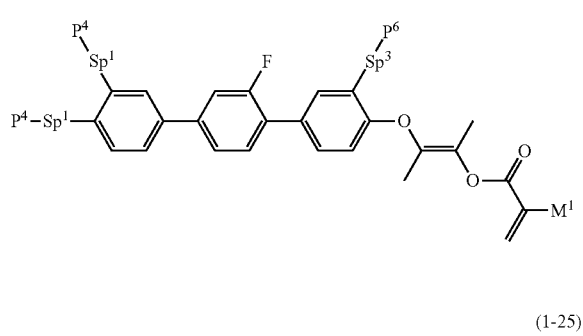

(1-25)

(1-26)
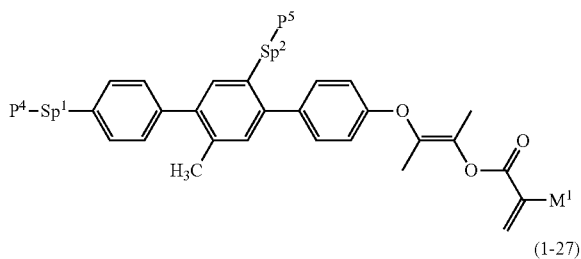

(1-27)
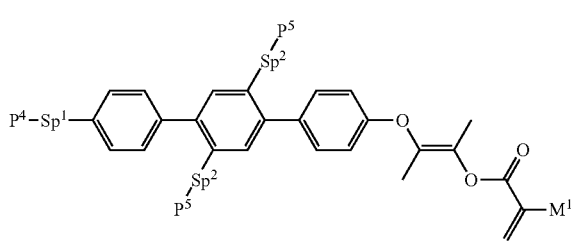

wherein, in formula (1-1) to formula (1-27), $P^4$, $P^5$ and $P^6$ are independently a polymerizable group selected from the group of groups represented by formula (P-1) to formula (P-3);

(P-1)
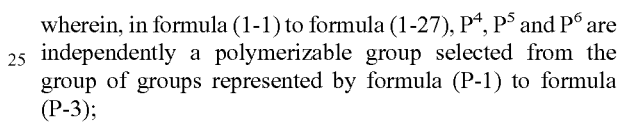

(P-2)
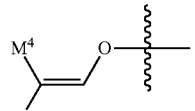

(P-3)
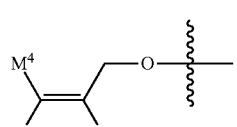

wherein, in formula (P-1) to formula (P-3), $M^2$, $M^3$ and $M^4$ are independently hydrogen, fluorine, alkyl having 1 to 5 carbons, or alkyl having 1 to 5 carbons in which at least one piece of hydrogen is replaced by fluorine or chlorine; and in formula (1-1) to formula (1-27), $Sp^1$, $Sp^2$ and $Sp^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH═CH— or —C≡C—, and in the groups, at least one piece of hydrogen may be replaced by fluorine or chlorine; and $M^1$ is hydrogen or methyl.

Item 4. The liquid crystal composition according to item 1, wherein $P^1$, $P^2$ and $P^3$ are methacryloyloxy, and $Sp^1$, $Sp^2$ and $Sp^3$ are a single bond.

Item 5. The liquid crystal composition according to any one of items 1 to 4, containing at least one compound selected from the group of compounds represented by formula (2) as a first component:

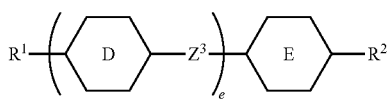
(2)

wherein, in formula (2), $R^1$ and $R^2$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; ring D and ring E are independently 1,4-cyclohexylene, 1,4-phenylene, 2-fluoro-1,4-phenylene or 2,5-difluoro-1,4-phenylene; $Z^3$ is a single bond, ethylene or carbonyloxy; and e is 1, 2 or 3.

Item 6. The liquid crystal composition according to any one of items 1 to 5, containing at least one compound selected from the group of compounds represented by formula (2-1) to formula (2-13) as the first component:

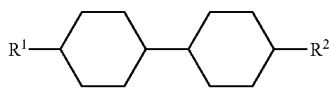
(2-1)

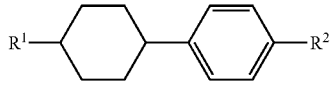
(2-2)

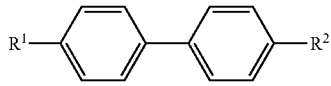
(2-3)

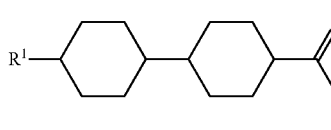
(2-4)

(2-5)

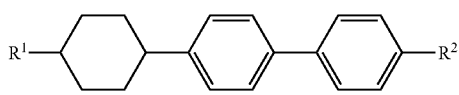
(2-6)

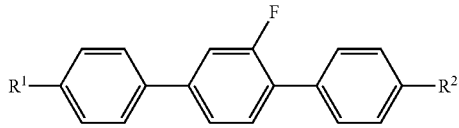
(2-7)

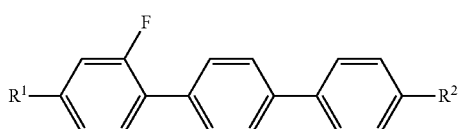
(2-8)

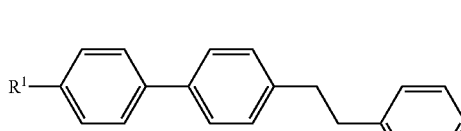
(2-9)

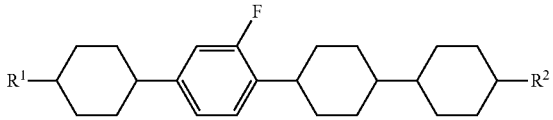
(2-10)

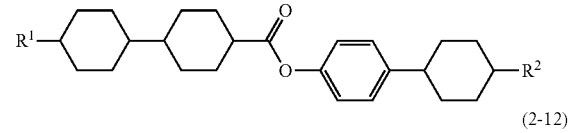
(2-11)

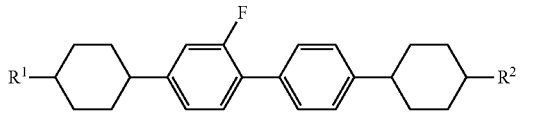
(2-12)

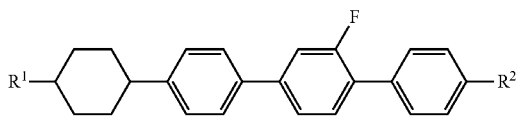
(2-13)

wherein, in formula (2-1) to formula (2-13), $R^1$ and $R^2$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine.

Item 7. The liquid crystal composition according to item 5 or 6, wherein a proportion of the first component is in the range of 10% by weight to 70% by weight.

Item 8. The liquid crystal composition according to any one of items 1 to 7, containing at least one compound selected from the group of compounds represented by formula (3) as a second

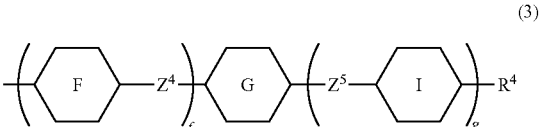
(3)

wherein, in formula (3), $R^3$ and $R^4$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine; ring F and ring I are independently 1,4-cyclohexylene, 1,4-cyclohexenylene, tetrahydropyran-2,5-diyl, 1,4-phenylene, 1,4-phenylene in which at least one piece of hydrogen is replaced by fluorine or chlorine, naphthalene-2,6-diyl, naphthalene-2,6-diyl in which at least one piece of hydrogen is replaced by fluorine or chlorine, chroman-2,6-diyl, or chroman-2,6-diyl in which at least one piece of hydrogen is replaced by fluorine or chlorine; ring G is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^4$ and $Z^5$ are independently a single bond, ethylene, carbonyloxy or methyleneoxy; f is 1, 2 or 3; g is 0 or 1; and a sum of f and g is 3 or less.

Item 9. The liquid crystal composition according to any one of items 1 to 8, containing at least one compound selected from the group of compounds represented by formula (3-1) to formula (3-22) as the second component:
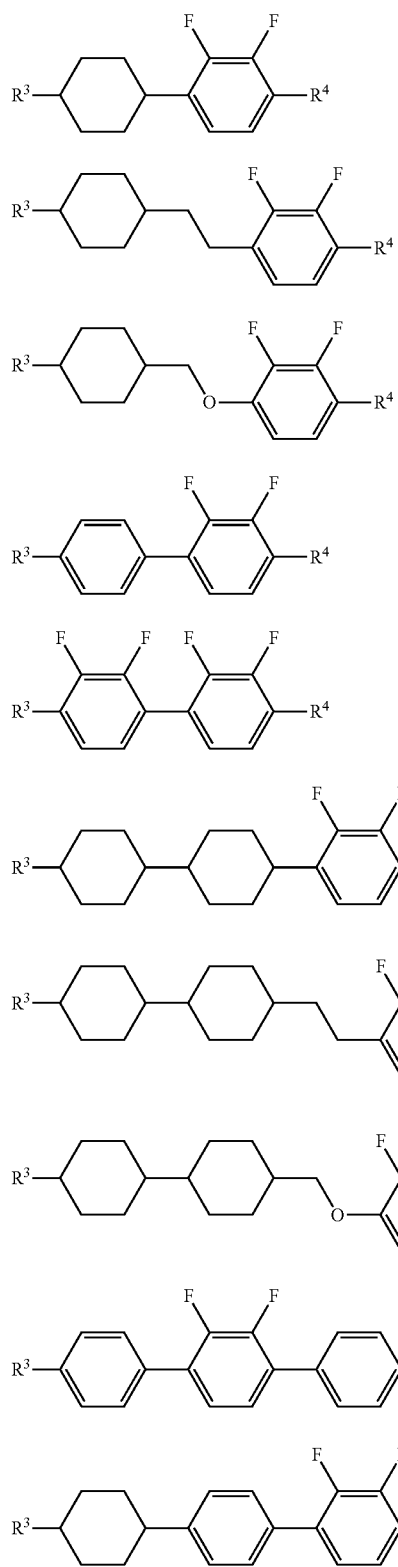
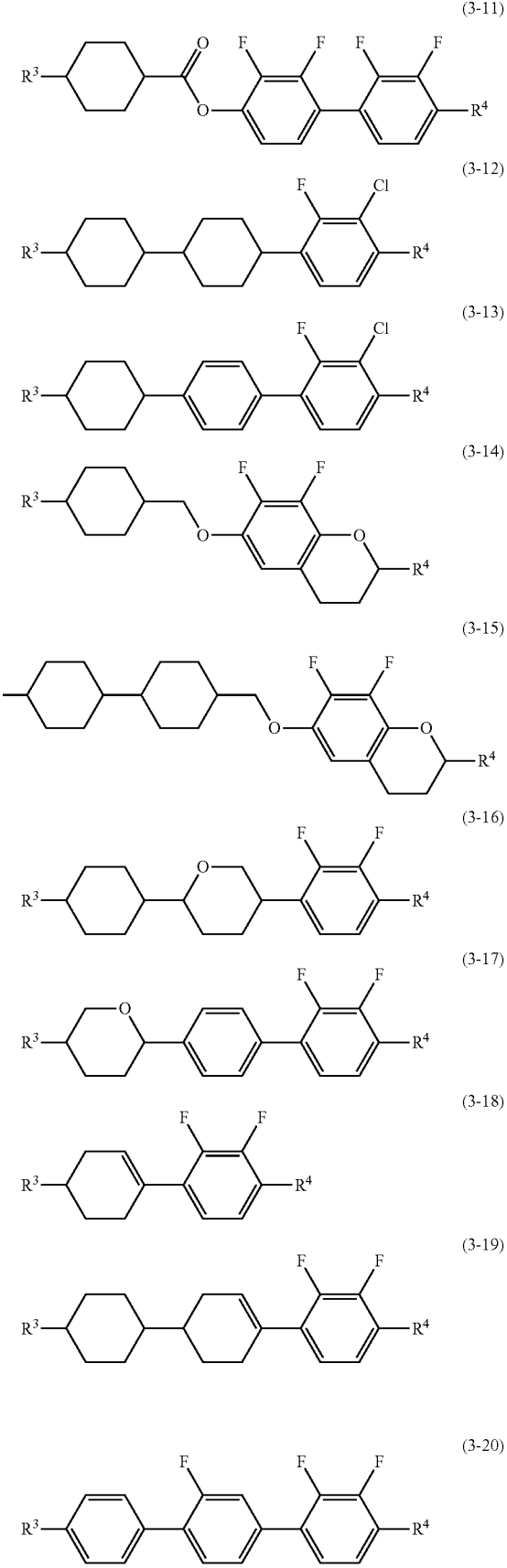

(3-21)

(3-22)

wherein, in formula (3-1) to formula (3-22), $R^3$ and $R^4$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine.

Item 10. The liquid crystal composition according to item 8 or 9, wherein a proportion of the second component is in the range of 10% by weight to 90% by weight.

Item 11. The liquid crystal composition according to any one of items 1 to 10, further containing at least one polymerizable compound selected from the group of compounds represented by formula (4):

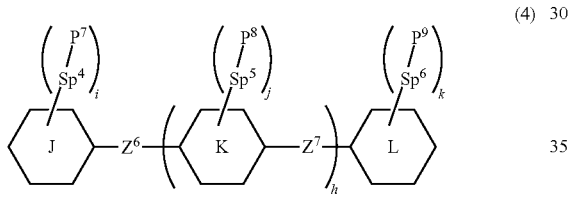

(4)

wherein, in formula (4), ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^6$ and $Z^7$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH=CH—, —C($CH_3$)=CH—, —CH=C($CH_3$)— or —C($CH_3$)=C($CH_3$)—, and in the groups, at least one piece of hydrogen may be replaced by fluorine or chlorine; $P^7$, $P^8$ and $P^9$ are independently a polymerizable group; $Sp^4$, $Sp^5$ and $Sp^6$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or —C≡C—, and in the groups, at least one piece of hydrogen may be replaced by fluorine or chlorine; h is 0, 1 or 2; i, j and k are independently 0, 1, 2, 3 or 4; and a sum of i, j and k is 1 or more.

Item 12. The liquid crystal composition according to item 11, wherein, in formula (4), $P^7$, $P^8$ and $P^9$ are independently a polymerizable group selected from the group of groups represented by formula (P-1) to formula (P-5):

(P-1)

(P-2)

(P-3)

(P-4)

(P-5)

wherein, in formula (P-1) to formula (P-5), $M^2$, $M^3$ and $M^4$ are independently hydrogen, fluorine, alkyl having 1 to 5 carbons, or alkyl having 1 to 5 carbons in which at least one piece of hydrogen is replaced by fluorine or chlorine.

Item 13. The liquid crystal composition according to any one of items 1 to 12, further containing at least one polymerizable compound selected from the group of compounds represented by formula (4-1) to formula (4-27):

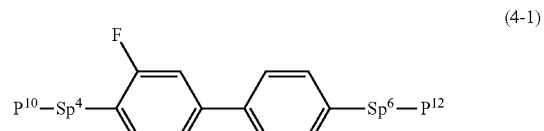

(4-1)

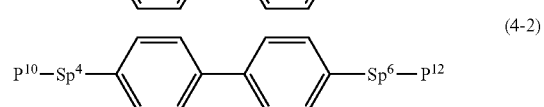

(4-2)

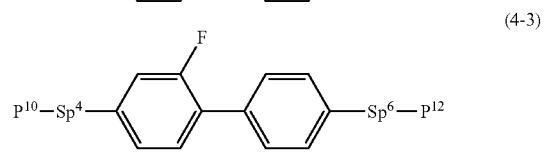

(4-3)

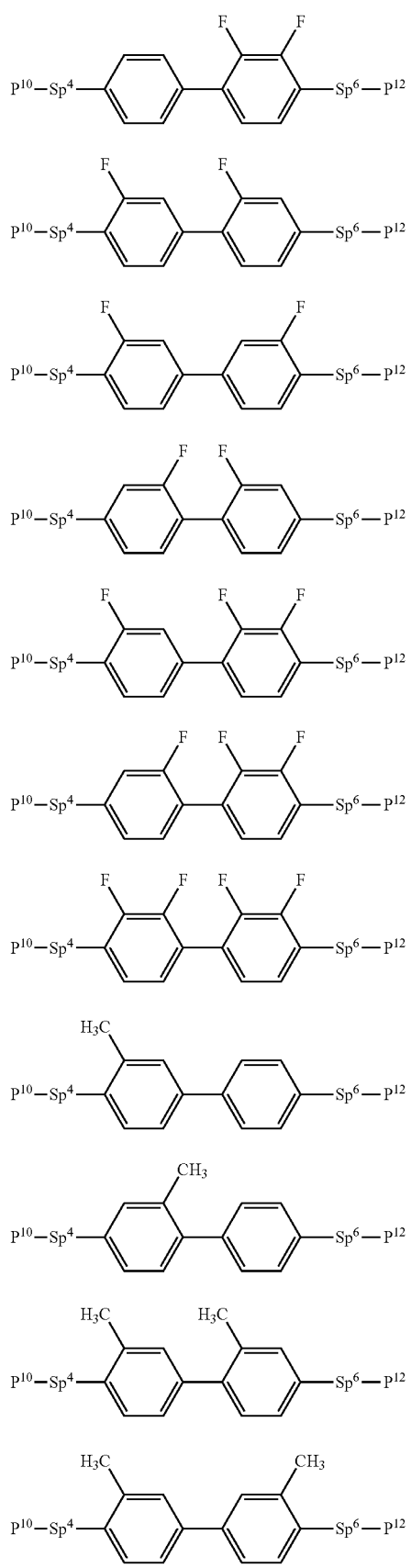
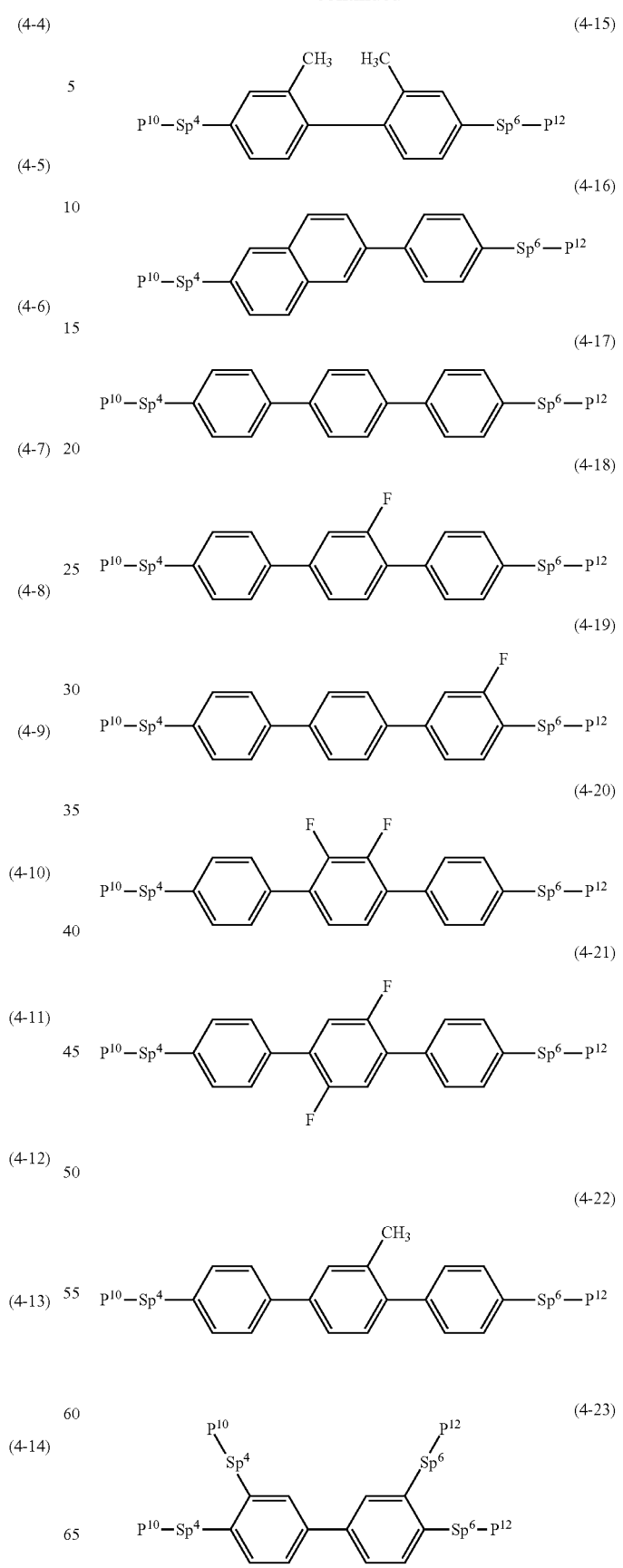

-continued

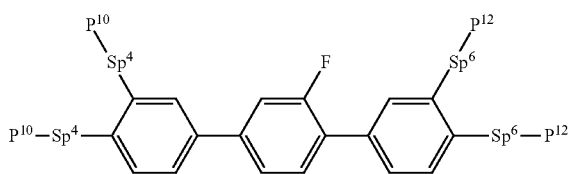
(4-24)

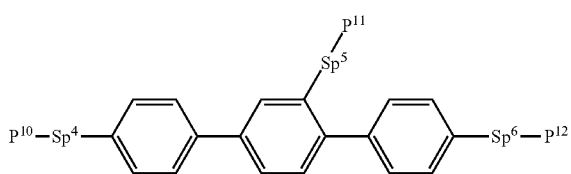
(4-25)

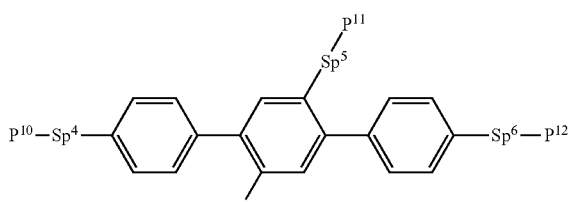
(4-26)

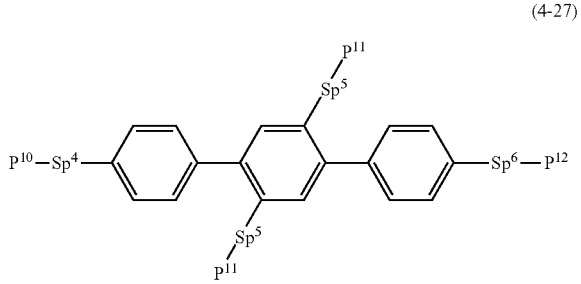
(4-27)

wherein, in formula (4-1) to formula (4-27), $P^{10}$, $P^{11}$ and $P^{12}$ are independently a polymerizable group selected from the group of groups represented by formula (P-1) to formula (P-3);

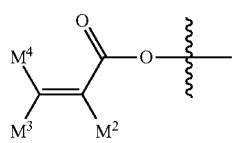
(P-1)

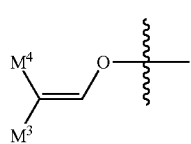
(P-2)

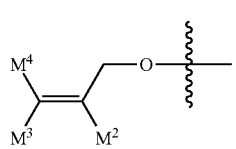
(P-3)

wherein, in formula (P-1) to formula (P-3), $M^2$, $M^3$ and $M^4$ are independently hydrogen, fluorine, alkyl having 1 to 5 carbons, or alkyl having 1 to 5 carbons in which at least one piece of hydrogen is replaced by fluorine or chlorine; and in formula (4-1) to formula (4-27), $Sp^4$, $Sp^5$ and $Sp^6$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or —C≡C—, and in the groups, at least one piece of hydrogen may be replaced by fluorine or chlorine.

Item 14. The liquid crystal composition according to any one of items 1 to 13, wherein a proportion of the polymerizable compound is the range of 0.03% by weight to 10% by weight.

Item 15. A liquid crystal display device, including the liquid crystal composition according to any one of items 1 to 14.

Item 16. The liquid crystal display device according to item 15, wherein an operating mode in the liquid crystal display device includes an IPS mode, a VA mode, an FFS mode or an FPA mode, and a driving mode in the liquid crystal display device includes an active matrix mode.

Item 17. A polymer sustained alignment mode liquid crystal display device, wherein the liquid crystal display device includes the liquid crystal composition according to any one of items 1 to 14, or the polymerizable compound in the liquid crystal composition is polymerized.

Item 18. Use of the liquid crystal composition according to any one of items 1 to 14 in a liquid crystal display device.

Item 19. Use of the liquid crystal composition according to any one of items 1 to 14 in a polymer sustained alignment mode liquid crystal display device.

The invention further includes the following items: (a) a method of manufacturing the liquid crystal display device by arranging the liquid crystal composition between two substrates, irradiating the composition with light in a state in which voltage is applied to the composition, and polymerizing the polar compound having the polymerizable group contained in the composition; and (b) the liquid crystal composition having the maximum temperature of the nematic phase is 70° C. or higher, an optical anisotropy (measured at 25° C.) at a wavelength of 589 nanometers is 0.08 or more and a dielectric anisotropy (measured at 25° C.) at a frequency of 1 kHz is −2 or less.

The invention further includes the following items: (c) the composition containing at least one compound selected from the group of compound (5) to compound (7) having positive dielectric anisotropy as described in JP 2006-199941 A; (d) the composition containing polymerizable compound (1); (e) the composition containing polymerizable compound (1) and polymerizable compound (4); (f) the composition containing a polymerizable compound different from polymerizable compound (1) and polymerizable compound (4); (g) the composition, containing at least one of additives such as an optically active compound, an antioxidant, an ultraviolet light absorber, a dye, an antifoaming agent, a polymerization initiator or a polymerization inhibitor; (h) an AM device including the composition; (i) a device including the composition and having a TN mode, an ECB mode, an OCB mode, an IPS mode, an FFS mode, a VA mode or an FPA mode; (j) a transmissive device including the composition; (k) use of the composition as a composition having the nematic phase; and (l) use as an optically active composition by adding an optically active compound to the composition.

The composition of the invention will be described in the following order. First, a constitution of the component compounds in the composition will be described. Second, main characteristics of the component compounds and main effects of the compounds on the composition will be described. Third, a combination of components in the composition, a preferred proportion of the components and the basis thereof will be described. Fourth, a preferred embodiment of the component compounds will be described. Fifth, a preferred component compounds will be described. Sixth, an additive that may be added to the composition will be described. Seventh, methods for synthesizing the component compounds will be described. Last, an application of the composition will be described.

First, the constitution of the composition will be described. The composition of the invention is classified into composition A and composition B. Composition A may further contain any other liquid crystal compound, an additive or the like in addition to the liquid crystal compound selected from compound (2) and compound (3). An expression "any other liquid crystal compound" means a liquid crystal compound different from compound (2) and compound (3). Such a compound is mixed with the composition for the purpose of further adjusting the characteristics. The additive includes the optically active compound, the anti-oxidant, the ultraviolet light absorber, the dye, the antifoaming agent, the polymerizable compound, the polymerization initiator, the polymerization inhibitor or the polar compound.

Composition B consists essentially of liquid crystal compounds selected from compound (2) and compound (3). An expression "essentially" means that the composition may contain the additive, but contains no any other liquid crystal compound. Composition B has a smaller number of components than composition A has. Composition B is preferred to composition A in view of cost reduction. Composition A is preferred to composition B in view of possibility of further adjusting the characteristics by mixing any other liquid crystal compound.

Second, the main characteristics of the component compounds and the main effects of the compounds on the characteristics of the composition will be described. The main characteristics of the component compounds are summarized in Table 2 on the basis of advantageous effects of the invention. In Table 2, a symbol L stands for "large" or "high," a symbol M stands for "medium" and a symbol S stands for "small" or "low." The symbols L, M and S represent a classification based on a qualitative comparison among the component compounds, and a symbol "0" means that "a value is zero" or "a value close to zero."

TABLE 2

Characteristics of Compounds

| Compounds | Compound (2) | Compound (3) |
| --- | --- | --- |
| Maximum temperature | S to L | S to L |
| Viscosity | S to M | M to L |
| Optical anisotropy | S to L | M to L |
| Dielectric anisotropy | 0 | M to L[1) |
| Specific resistance | L | L |

[1)Compound having negative dielectric anisotropy.

Upon mixing the component compounds with the composition, the main effects of the component compounds on the characteristics of the composition are as described below. Compound (1) and compound (4) are polymerized to give a polymer, and the polymer shortens a response time of the device, and improves image persistence. Compound (2) as the first component decreases the viscosity or increases the maximum temperature. Compound (3) as the second component increases the dielectric anisotropy and decreases the minimum temperature.

Third, the combination of components in the composition, the preferred proportion of the components and the basis thereof will be described. A preferred combination of components in the composition includes a combination of compound (1) and the first component, a combination of compound (1) and the second component, a combination of compound (1), the first component and the second component, a combination of compound (1), the first component and compound (4), or a combination of compound (1), the first component, the second component and compound (4). A further preferred combination includes a combination of compound (1), the first component and the second component, or a combination of compound (1), the first component, the second component and compound (4).

The polymerizable compound such as compound (1) and compound (4) is added to the composition for the purpose of adapting the composition to the polymer sustained alignment mode device. A preferred proportion of the polymerizable compound is about 0.03% by weight or more for aligning the liquid crystal molecules, and about 10% by weight or less for preventing poor display in the device. A further preferred proportion is in the range of about 0.1% by weight to about 2% by weight. A particularly preferred proportion is in the range of about 0.2% by weight to about 1.0% by weight.

A preferred proportion of the first component is about 10% by weight or more for increasing the maximum temperature or decreasing the viscosity, and about 70% by weight or less for increasing the dielectric anisotropy. A further preferred proportion is in the range of about 10% by weight to about 65% by weight. A particularly preferred proportion is in the range of about 15% by weight to about 60% by weight.

A preferred proportion of the second component is about 10% by weight or more for increasing the dielectric anisotropy, and about 90% by weight or less for decreasing the viscosity. A further preferred proportion is in the range of about 15% by weight to about 80% by weight. A particularly preferred proportion is in the range of about 20% by weight to about 70% by weight.

The characteristics of the composition described in Table 1 can be adjusted by adjusting a proportion of the component compound. The characteristics may be adjusted by mixing any other liquid crystal compound when necessary. A composition having a maximum temperature of about 70° C. or higher can be prepared by such a method. A composition having a maximum temperature of about 75° C. or higher can also be prepared. A composition having a maximum temperature of about 80° C. or higher can also be prepared. A composition having a minimum temperature of about −10° C. or lower can be prepared by such a method. A composition having a minimum temperature of about −20° C. or lower can also be prepared. A composition having a minimum temperature of about −30° C. or lower can also be prepared.

A composition having optical anisotropy (measured at 25° C.) at a wavelength of 589 nanometers in the range of about 0.09 to about 0.12 can be prepared by such a method. A composition having optical anisotropy in the range of about 0.08 to about 0.16 can also be prepared. A composition having optical anisotropy in the range of about 0.07 to about 0.20 can also be prepared. A composition having dielectric anisotropy (measured at 25° C.) of about −1.5 or less at a frequency of 1 kHz can be prepared by such a method. A composition having dielectric anisotropy of about −2 or less can also be prepared. A composition having dielectric anisotropy of about −2.5 or less can also be prepared.

Fourth, the preferred embodiment of the component compounds will be described. In formula (1), ring A is cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine. Ring B and ring C are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine. Preferred ring A is phenyl. Preferred ring B is 3-fluoro-1,4-phenylene. Preferred ring C is 1,4-phenylene.

$Z^1$ and $Z^2$ are independently a single bond or alkylene having 1 to 10 carbons, and in the alkylene, at least one piece of —CH$_2$— may be replaced by —O—, —CO—, —COO— or —OCO—, and at least one piece of —CH$_2$—CH$_2$— may be replaced by —CH=CH—, —C(CH$_3$)=CH—, —CH=C(CH$_3$)— or —C(CH$_3$)=C(CH$_3$)—, and in the groups, at least one piece of hydrogen may be replaced by fluorine or chlorine. Preferred $Z^1$ or $Z^2$ is a single bond.

$M^1$ is hydrogen or methyl. Preferred $M^1$ is methyl.

$Sp^1$, $Sp^2$ and $Sp^3$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in the groups, at least one piece of hydrogen may be replaced by fluorine or chlorine. Preferred $Sp^1$, $Sp^2$ or $Sp^3$ is a single bond.

$P^1$, $P^2$ and $P^3$ are independently a polymerizable group. Preferred $P^1$, $P^2$ or $P^3$ is a polymerizable group selected from the group of groups represented by formula (P-1) to formula (P-5). Further preferred $P^1$, $P^2$ or $P^3$ is a polymerizable group selected from the group of groups represented by formula (P-1) to formula (P-3). Particularly preferred $P^1$, $P^2$ or $P^3$ is methacryloyloxy or acryloyloxy. A wavy line in formula (P-1) to formula (P-5) represents a site to form a bonding.

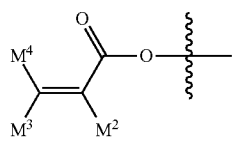
(P-1)

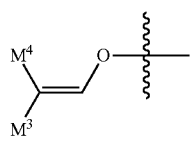
(P-2)

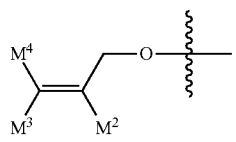
(P-3)

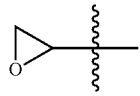
(P-4)

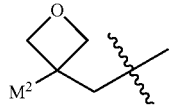
(P-5)

In formula (P-1) to formula (P-5), $M^2$, $M^3$ and $M^4$ are independently hydrogen, fluorine, alkyl having 1 to 5 carbons, or alkyl having 1 to 5 carbons in which at least one piece of hydrogen is replaced by fluorine or chlorine. Preferred $M^2$, $M^3$ or $M^4$ is hydrogen or methyl for increasing reactivity.

Then, a is 0, 1 or 2. Preferred a is 0 or 1. Then, b, c and d are independently 0, 1, 2, 3 or 4. Preferred b, c or d is 0 or 1.

In formula (2) and formula (3), $R^1$ and $R^2$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine. Preferred $R^1$ or $R^2$ is alkenyl having 2 to 12 carbons for decreasing the viscosity, and alkyl having 1 to 12 carbons for increasing the stability. $R^3$ and $R^4$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine. Preferred $R^3$ or $R^4$ is alkyl having 1 to 12 carbons for increasing the stability, and alkoxy having 1 to 12 carbons for increasing the dielectric anisotropy.

Preferred alkyl is methyl, ethyl, propyl, butyl, pentyl, hexyl, heptyl or octyl. Further preferred alkyl is methyl, ethyl, propyl, butyl or pentyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH=CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl.

Preferred alkenyloxy is vinyloxy, allyloxy, 3-butenyloxy, 3-pentenyloxy or 4-pentenyloxy. Further preferred alkenyloxy is allyloxy or 3-butenyloxy for decreasing the viscosity.

Specific examples of preferred alkenyl in which at least one piece of hydrogen is replaced by fluorine include 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples include 2,2-difluorovinyl or 4,4-difluoro-3-butenyl for decreasing the viscosity.

Alkyl has a straight-chain or branched-chain and contains no cyclic alkyl. Straight-chain alkyl is preferred to branched-chain alkyl. A same rule applies also to alkoxy, alkenyl, alkenyloxy, and alkenyl in which at least one piece of hydrogen is replaced by fluorine.

Ring D and ring E are independently 1,4-cyclohexylene, 1,4-phenylene, 2-fluoro-1,4-phenylene or 2,5-difluoro-1,4-phenylene. Preferred ring D or ring E is 1,4-cyclohexylene for decreasing the viscosity or increasing the maximum temperature, and 1,4-phenylene for decreasing the minimum temperature. With regard to a configuration of 1,4-cyclohexylene, trans is preferred to cis for increasing the maximum temperature.

Ring F and ring I are independently 1,4-cyclohexylene, 1,4-cyclohexenylene, tetrahydropyran-2,5-diyl, 1,4-phenylene, 1,4-phenylene in which at least one piece of hydrogen is replaced by fluorine or chlorine, naphthalene-2,6-diyl, naphthalene-2,6-diyl in which at least one piece of hydrogen is replaced by fluorine or chlorine, chroman-2,6-diyl, or chroman-2,6-diyl in which at least one piece of hydrogen is replaced by fluorine or chlorine. Preferred ring F or ring I is 1,4-cyclohexylene for decreasing the viscosity, tetrahydropyran-2,5-diyl for increasing the dielectric anisotropy, and 1,4-phenylene for increasing the optical anisotropy. Ring G is 2,3-difluoro-1,4-phenylene, 2-chloro-3-fluoro-1,4-phenylene, 2,3-difluor-5-methyl-1,4-phenylene, 3,4,5-trifluoronaphthalene-2,6-diyl or 7,8-difluorochroman-2,6-diyl. Preferred ring G is 2,3-difluoro-1,4-phenylene for decreasing the viscosity, 2-chloro-3-fluoro-1,4-phenylene for decreasing the optical anisotropy, and 7,8-difluorochroman-2,6-diyl for increasing the dielectric anisotropy. With regard to the configuration of 1,4-cyclohexylene, trans is preferred to cis for increasing the maximum temperature. Tetrahydropyran-2,5-diyl includes:

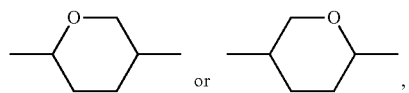

preferably

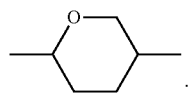

$Z^3$ is a single bond, ethylene or carbonyloxy. Preferred $Z^3$ is a single bond for increasing the stability. $Z^4$ and $Z^5$ are independently a single bond, ethylene, carbonyloxy or methyleneoxy. Preferred $Z^4$ or $Z^5$ is a single bond for decreasing the viscosity, ethylene for decreasing the minimum temperature, and methyleneoxy for increasing the dielectric anisotropy.

Then, e is 1, 2 or 3. Preferred e is 1 for decreasing the viscosity, and 2 or 3 for increasing the maximum temperature. Then, f is 1, 2 or 3, and g is 0 or 1, and a sum of f and g is 3 or less. Preferred f is 1 for decreasing the viscosity, and 2 or 3 for increasing the maximum temperature. Preferred g is 0 for decreasing the viscosity, and 1 for decreasing the minimum temperature.

In formula (4), $P^7$, $P^8$ and $P^9$ are independently a polymerizable group. Preferred $P^7$, $P^8$ or $P^9$ is a polymerizable group selected from the group of groups represented by formula (P-1) to formula (P-5). Further preferred $P^7$, $P^8$ or $P^9$ is a group represented by formula (P-1), formula (P-2) or formula (P-3). Particularly preferred $P^7$, $P^8$ or $P^9$ is a group represented by formula (P-1) or formula (P-2). Preferred $P^7$, $P^8$ or $P^9$ is a group represented by formula (P-1). A preferred group represented by formula (P-1) is —OCO—CH=CH$_2$ or —OCO—C(CH$_3$)=CH$_2$. A wavy line in formula (P-1) to formula (P-5) represents a site to form a bonding.

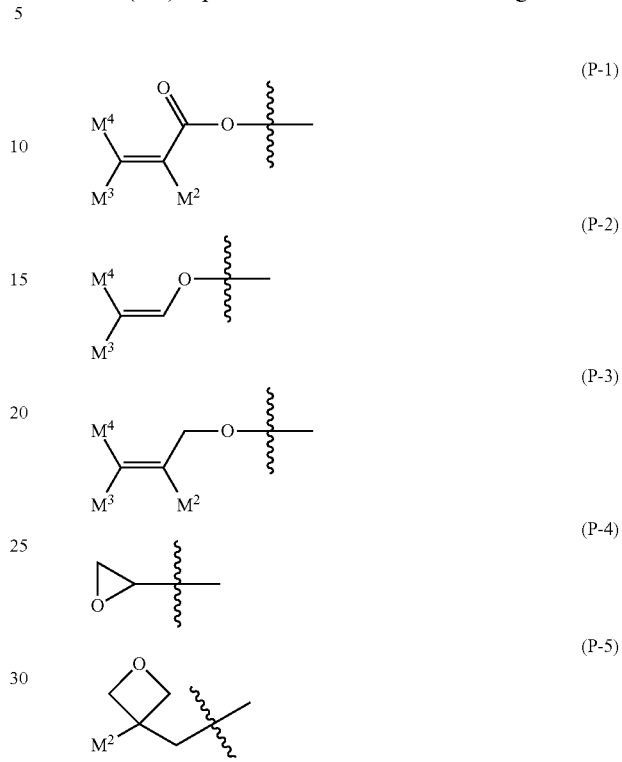

In formula (P-1) to formula (P-5), $M^2$, $M^3$ and $M^4$ are independently hydrogen, fluorine, alkyl having 1 to 5 carbons, or alkyl having 1 to 5 carbons in which at least one piece of hydrogen is replaced by fluorine or chlorine. Preferred $M^2$, $M^3$ or $M^4$ is hydrogen or methyl for increasing the reactivity. Further preferred $M^2$ is hydrogen or methyl, and further preferred $M^3$ or $M^4$ is hydrogen.

$Sp^4$, $Sp^5$ and $Sp^6$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH=CH— or —C≡C—, and in the groups, at least one piece of hydrogen may be replaced by fluorine or chlorine. Preferred $Sp^4$, $Sp^5$ or $Sp^6$ is a single bond, —CH$_2$—CH$_2$—, —CH$_2$O—, —OCH$_2$—, —COO—, —OCO—, —CO—CH=CH— or —CH=CH—CO—. Further preferred $Sp^4$, $Sp^5$ or $Sp^6$ is a single bond.

In formula (4), when all of i pieces of $P^7$ and k pieces of $P^9$ are the group represented by formula (P-4), at least one piece of i pieces of $Sp^4$ and k pieces of $Sp^6$ is alkylene having 1 to 10 carbons in which at least one piece of —CH$_2$— is replaced by —O—, —COO—, —OCO— or —OCOO—.

Ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine. Preferred ring J or ring L is phenyl. Ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine. Preferred ring K is 1,4-phenylene or 2-fluoro-1,4-phenylene.

$Z^6$ and $Z^7$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH=CH—, —C(CH$_3$)=CH—, —CH=C(CH$_3$)— or —C(CH$_3$)=C(CH$_3$)—, and in the groups, at least one piece of hydrogen may be replaced by fluorine or chlorine. Preferred $Z^6$ or $Z^7$ is a single bond, —$CH_2$—$CH_2$—, —$CH_2$O—, —O$CH_2$—, —COO— or —OCO—. Further preferred $Z^6$ or $Z^7$ is a single bond.

Then, h is 0, 1 or 2. Preferred h is 0 or 1. Then, i, j and k are independently 0, 1, 2, 3 or 4, and a sum of i, j and k is 1 or more. Preferred i, j or k is 1 or 2.

Fifth, the preferred component compounds will be described. Preferred compound (1) includes compound (1-1) to compound (1-27) described in item 3. Further preferred compound (1) includes compound (1-1), compound (1-2) or compound (1-18).

Preferred compound (2) includes compound (2-1) to compound (2-13) described in item 6. In the compounds, at least one of the first components preferably includes compound (2-1), compound (2-3), compound (2-5), compound (2-6) or compound (2-7). At least two of the second components preferably include a combination of compound (2-1) and compound (2-3), and a combination of compound (2-1), and compound (2-5).

Preferred compound (3) includes compound (3-1) to compound (3-22) described in item 9. In the compounds, at least one of the second components preferably includes compound (3-1), compound (3-2), compound (3-3), compound (3-4), compound (3-6), compound (3-7), compound (3-8) or compound (3-10). At least two of the third components preferably include a combination of compound (3-1) and compound (3-6), a combination of compound (3-1) and compound (3-10), a combination of compound (3-3) and compound (3-6), a combination of compound (3-3) and compound (3-10), a combination of compound (3-4) and compound (3-6), or a combination of compound (3-4) and compound (3-10).

Preferred compound (4) includes compound (4-1) to compound (4-27) described in item 13. In the compounds, at least one of the additive components preferably includes compound (4-1), compound (4-2), compound (4-24), compound (4-25), compound (4-26) or compound (4-27). At least two of the additive components preferably include a combination of compound (4-1) and compound (4-2), a combination of compound (4-1) and compound (4-18), a combination of compound (4-2) and compound (4-24), a combination of compound (4-2) and compound (4-25), a combination of compound (4-2) and compound (4-26), a combination of compound (4-25) and compound (4-26) or a combination of compound (4-18) and compound (4-24).

Sixth, the additive that may be added to the composition will be described. Such an additive includes the optically active compound, the antioxidant, the ultraviolet light absorber, the dye, the antifoaming agent, the polymerizable compound, the polymerization initiator and the polymerization inhibitor. The optically active compound is added to the composition for the purpose of inducing a helical structure in the liquid crystal molecule to give a twist angle. Examples of such a compound include compound (5-1) to compound (5-5). A preferred proportion of the optically active compound is about 5% by weight or less. A further preferred proportion is in the range of about 0.01% by weight to about 2% by weight.

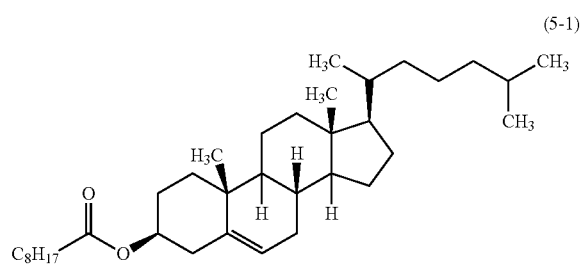

(5-1)

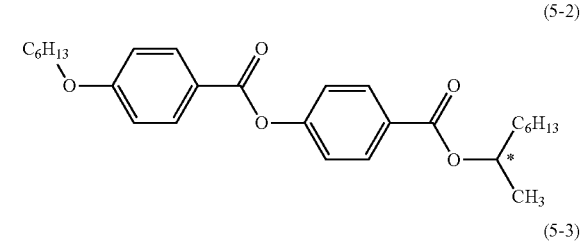

(5-2)

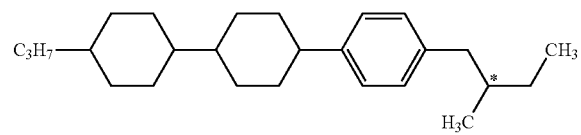

(5-3)

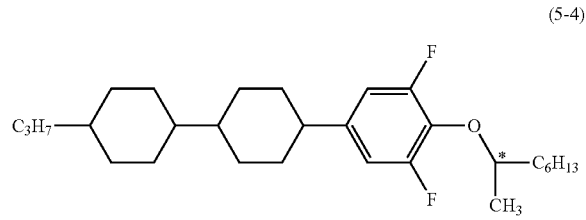

(5-4)

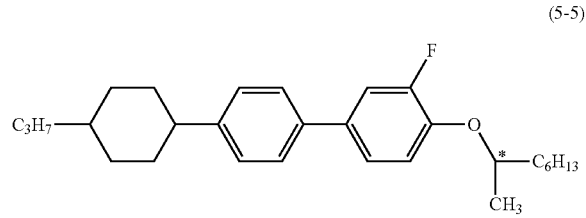

(5-5)

The antioxidant is added to the composition for preventing a decrease in the specific resistance caused by heating in air, or for maintaining the large voltage holding ratio at room temperature and also at the temperature close to the maximum temperature even after the device has been used for a long period of time. Specific examples of a preferred antioxidant include compound (6) in which n is an integer from 1 to 9.

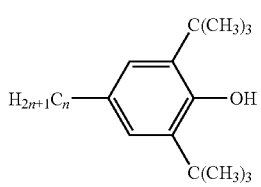

(6)

In compound (6), preferred n is 1, 3, 5, 7 or 9. Further preferred n is 7. Compound (6) in which n is 7 is effective in maintaining a large voltage holding ratio at room temperature and also at the temperature close to the maximum temperature even after the device has been used for a long period of time because such compound (6) has a small volatility. A preferred proportion of the antioxidant is about 50 ppm or more for achieving an effect thereof, and about 600 ppm or less for avoiding a decrease in the maximum temperature or an increase in the minimum temperature. A further preferred proportion is in the range of about 100 ppm to about 300 ppm.

Specific examples of a preferred ultraviolet light absorber include a benzophenone derivative, a benzoate derivative and a triazole derivative. A light stabilizer such as an amine having steric hindrance is also preferred. A preferred proportion of the absorber and the stabilizer is about 50 ppm or more for achieving an effect thereof, and about 10,000 ppm or less for avoiding a decrease in the maximum temperature or an increase in the minimum temperature. A further preferred proportion is in the range of about 100 ppm to about 10,000 ppm.

A dichroic dye such as an azo dye or an anthraquinone dye is added to the composition to be adapted for a device having a guest host (GH) mode. A preferred proportion of the dye is in the range of about 0.01% by weight to about 10% by weight. The antifoaming agent such as dimethyl silicone oil or methyl phenyl silicone oil is added to the composition for preventing foam formation. A preferred proportion of the antifoaming agent is about 1 ppm or more for achieving an effect thereof, and about 1,000 ppm or less for preventing a poor display. A further preferred proportion is in the range of about 1 ppm to about 500 ppm.

The polymerizable compound is added to the composition to be adapted for a polymer sustained alignment (PSA) mode device. Compound (1) and compound (4) are suitable for the purpose. Any other polymerizable compound that is different from compound (1) and compound (4) may be added to the composition together with compound (1) and compound (4). Specific examples of a preferred any other polymerizable compound include acrylate, methacrylate, a vinyl compound, a vinyloxy compound, propenyl ether, an epoxy compound (oxirane, oxetane) and vinyl ketone compound. Further preferred examples include an acrylate derivative or a methacrylate derivative. When adding any other polymerizable compound, a preferred proportion of compound (1) or a preferred proportion of amounts of compound (1) and compound (4) is about 10% by weight or more based on the total weight of the polymerizable compound. A further preferred proportion is about 50% by weight or more. A particularly preferred proportion is about 80% by weight or more. A particularly preferred proportion is also 100% by weight. Reactivity and a pretilt angle can be improved or made suitable to efficiently express the PSA effect and increase the ability to carry out alignment of the liquid crystal molecules, by combining compound (1) with compound (4) or compound (1) and compound (4) with any other polymerizable compounds at a suitable ratio. Further, the combination can widely correspond to a cell production process, and can improve failures such as unevenness and a contrast drop resulting from the production process to produce a high-definition liquid crystal display device.

The polymerizable compound such as compound (1) or compound (4) is polymerized by irradiation with ultraviolet light. The polymerizable compound may be polymerized in the presence of a suitable initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred proportion of the photopolymerization initiator is in the range of about 0.1% by weight to about 5% by weight based on the total weight of the polymerizable compound. A further preferred proportion is in the range of about 1% by weight to about 3% by weight based thereon.

Upon storing the polymerizable compound such as compound (1) or compound (4), the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butylcatechol, 4-methoxyphenol and phenothiazine.

Seventh, the methods for synthesizing the component compounds will be described. The compounds can be prepared according to known methods. Examples of the synthetic methods will be described. The synthetic method of compound (1) is described in the section of Examples. Compound (2-1) is prepared according to a method described in JP S59-176221 A. Compound (3-6) is prepared according to a method described in JP 2000-53602 A. Compound (4-18) is prepared according to a method described in JP H7-101900 A. The antioxidant is commercially available. A compound in which n in formula (6) is 1 is available from Sigma-Aldrich Corporation. Compound (6) in which n is 7 or the like is prepared according to a method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be described. Most of the composition has the minimum temperature of about −10° C. or lower, the maximum temperature of about 70° C. or higher, and the optical anisotropy in the range of about 0.07 to about 0.20. The composition having optical anisotropy in the range of about 0.08 to about 0.25 may be prepared by controlling a proportion of the component compounds or by mixing any other liquid crystal compound. The composition having optical anisotropy in the range of about 0.10 to about 0.30 may be prepared by trial and error. A device including the composition has the large voltage holding ratio. The composition is suitable for use in the AM device. The composition is particularly suitable for use in a transmissive AM device. The composition can be used as the composition having the nematic phase, and as the optically active composition by adding the optically active compound.

The composition can be used for the AM device. The composition can also be used for a PM device. The composition can also be used for the AM device and the PM device each having a mode such as the PC mode, the TN mode, the STN mode, the ECB mode, the OCB mode, the IPS mode, the FFS mode, the VA mode and the FPA mode. Use for the AM device having a mode such as the TN mode, the OCB mode, the IPS mode and the FFS mode is particularly preferred. In the AM device having the IPS mode or the FFS mode, alignment of liquid crystal molecules when no voltage is applied may be parallel or vertical to a glass substrate. The devices may be of a reflective type, a transmissive type or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, or for a polymer dispersed (PD) device in which a three-dimensional network-polymer is formed in the composition.

One example of a conventional method for manufacturing the device having the polymer sustained alignment mode is as described below. A device having two substrates referred to as an array substrate and a color filter substrate is assembled. The substrate has an alignment film. At least one of the substrates has an electrode layer. The liquid crystal composition is prepared by mixing the liquid crystal compound. The polymerizable compound is added to the composition. The additive may be further added thereto when necessary. The composition is injected into the device. The device is irradiated with light in a state in which voltage is applied. Irradiation with ultraviolet light is preferred. The polymerizable compound is polymerized by the light irradiation. The composition containing a polymer is generated by the polymerization. The device having the polymer sustained alignment mode is produced by such a procedure.

In the procedure, when voltage is applied, the liquid crystal molecules are aligned due to an effect of the alignment film and an electric field. Molecules of the polymerizable compound are also aligned according to the alignment. The polymerizable compound is polymerized by ultraviolet light in the above state, and therefore the polymer in which the alignment is maintained is formed. The response time of the device is shortened due to the effect of the polymer. The image persistence is caused due to poor operation in the liquid crystal molecules, and therefore is to be simultaneously improved by the effect of the polymer. In addition, the polymerizable compound in the composition is previously polymerized, and the composition may be arranged between the substrates in the liquid crystal display device.

EXAMPLES

The invention will be described in greater detail by way of Examples. However, the invention is not limited by the Examples. The invention includes a mixture of composition M1 and composition M2. The invention also includes a mixture in which at least two compositions in Examples were mixed. The thus prepared compound was identified by methods such as an NMR analysis. Characteristics of the compound, the composition and the device were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-14B Gas Chromatograph made by Shimadzu Corporation was used. A carrier gas was helium (2 mL per minute). A sample vaporizing chamber and a detector (FID) were set to 280° C. and 300° C., respectively. A capillary column DB-1 (length 30 m, bore 0.32 mm, film thickness 0.25 μm; dimethylpolysiloxane as a stationary phase; non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample vaporizing chamber. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of liquid crystal compounds contained in the composition may be calculated by the method as described below. The mixture of liquid crystal compounds is detected by gas chromatograph (FID). An area ratio of each peak in the gas chromatogram corresponds to the ratio (weight ratio) of the liquid crystal compound. When the capillary columns described above were used, a correction coefficient of each of the liquid crystal compounds may be regarded as 1 (one). Accordingly, the proportion (% by weight) of the liquid crystal compounds can be calculated from the area ratio of each peak.

Sample for measurement: When characteristics of the composition and the device were measured, the composition was used as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)={(measured value of a sample)−0.85×(measured value of a base liquid crystal)}/0.15. When a smectic phase (or crystals) precipitates at the ratio thereof at 25° C., a ratio of the compound to the base liquid crystal was changed step by step in the order of (10% by weight:90% by weight), (5% by weight:95% by weight) and (1% by weight: 99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

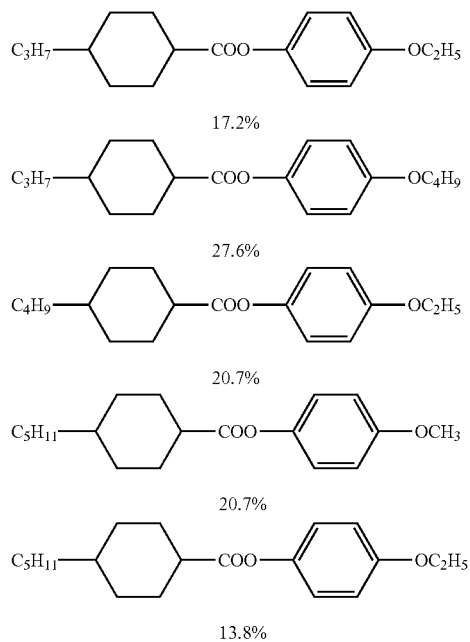

Measuring method: Characteristics were measured according to the methods described below. Most of the measuring methods are applied as described in the Standard of Japan Electronics and Information Technology Industries Association (hereinafter abbreviated as JEITA) (JEITA ED-2521B) discussed and established by JEITA, or modified thereon. No thin film transistor (TFT) was attached to a TN device used for measurement.

(1) Maximum temperature of the nematic phase (NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured. A maximum temperature of the nematic phase may be occasionally abbreviated as "maximum temperature."

(2) Minimum temperature of a nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., To was expressed as $T_c$<−20° C. A minimum temperature of the nematic phase may be occasionally abbreviated as "minimum temperature."

(3) Viscosity (bulk viscosity; q; measured at 20° C.; mPa·s): For measurement, a cone-plate (E type) rotational viscometer made by Tokyo Keiki, Inc. was used.

(4) Viscosity (rotational viscosity; yl; measured at 25° C.; mPa·s): Measurement was carried out according to the method described in M. Imai et al., Molecular Crystals and Liquid Crystals, Vol. 259, p. 37 (1995). A sample was injected into a VA device in which a distance (cell gap) between two glass substrates was 20 micrometers. Voltage was applied stepwise to the device in the range of 39 V to 50 V at an increment of 1 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and calculation equation (8) described on page 40 of the paper presented by M. Imai et al. A dielectric anisotropy required for the calculation was measured according to a method described in section (6).

(5) Optical anisotropy (refractive index anisotropy; $\Delta n$; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index ($n\|$) was measured when a direction of polarized light was parallel to a direction of rubbing. A refractive index ($n\perp$) was measured when the direction of polarized light was perpendicular to the direction of rubbing. A value of optical anisotropy was calculated from an equation: $\Delta n = n\| - n\perp$.

(6) Dielectric anisotropy ($\Delta\varepsilon$; measured at 25° C.): A value of dielectric anisotropy was calculated from an equation: $\Delta\varepsilon = \varepsilon\| - \varepsilon\perp$. A dielectric constants ($\varepsilon\|$ and $\varepsilon\perp$) was measured as described below.

(1) Measurement of a dielectric constant ($\varepsilon\|$): An ethanol (20 mL) solution of octadecyltriethoxysilane (0.16 mL) was applied to a well-cleaned glass substrate. After rotating the glass substrate with a spinner, the glass substrate was heated at 150° C. for 1 hour. A sample was injected into a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant ($\varepsilon\|$) of the liquid crystal molecules in a major axis direction was measured.

(2) Measurement of a dielectric constant ($\varepsilon\perp$): A polyimide solution was applied to a well-cleaned glass substrate. After calcining the glass substrate, rubbing treatment was applied to the alignment film obtained. A sample was injected into a TN device in which a distance (cell gap) between two glass substrates was 9 micrometers and a twist angle was 80 degrees. Sine waves (0.5 V, 1 kHz) were applied to the device, and after 2 seconds, a dielectric constant ($\varepsilon\perp$) of the liquid crystal molecules in a minor axis direction was measured.

(7) Threshold voltage (Vth; measured at 25° C.; V): For measurement, an LCD-5100 luminance meter made by Otsuka Electronics Co., Ltd. was used. A light source was a halogen lamp. A sample was put in a normally black mode VA device in which a distance (cell gap) between two glass substrates was 4 micrometers and a rubbing direction was anti-parallel, and the device was sealed with an ultraviolet-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of a voltage at 10% transmittance.

(8) Voltage holding ratio (VHR-1; measured at 25° C.; %): A TN device used for measurement had a polyimide alignment film, and a distance (cell gap) between two glass substrates was 5 micrometers. A sample was injected into the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is expressed in terms of a percentage of area A to area B.

(9) Voltage holding ratio (VHR-2; measured at 80° C.; %): A voltage holding ratio was measured according to procedures identical with the procedures described above except that measurement was carried out at 80° C. in place of 25° C. The thus obtained value was expressed in terms of VHR-2.

(10) Voltage holding ratio (VHR-3; measured at 25° C.; %): Stability to ultraviolet light was evaluated by measuring a voltage holding ratio after a device was irradiated with ultraviolet light. A TN device used for measurement had a polyimide alignment film and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In measurement of VHR-3, a decaying voltage was measured for 16.7 milliseconds. A composition having large VHR-3 has a large stability to ultraviolet light. A value of VHR-3 is preferably 90% or more, and further preferably 95% or more.

(11) Voltage holding ratio (VHR-4; measured at 25° C.; %): Stability to heat was evaluated by measuring a voltage holding ratio after a TN device into which a sample was injected was heated in a constant-temperature bath at 80° C. for 500 hours. In measurement of VHR-4, a decaying voltage was measured for 16.7 milliseconds. A composition having large VHR-4 has a large stability to heat.

(12) Response time (T; measured at 25° C.; ms): For measurement, an LCD-5100 luminance meter made by Otsuka Electronics Co., Ltd. was used. A light source was a halogen lamp. A low-pass filter was set to 5 kHz.

(1) A composition containing no polymerizable compound: A sample was put in a normally black mode VA device in which a distance (cell gap) between two glass substrates was 4 micrometers and a rubbing direction was anti-parallel. The device was sealed with an ultraviolet-curable adhesive. A voltage (rectangular waves; 60 Hz, 10 V, 0.5 second) was applied to the device. On the occasion, the device was irradiated with light from a direction perpendicular to the device, and an amount of light transmitted through the device was measured. The maximum amount of light corresponds to 100% transmittance and the minimum amount of light corresponds to 0% transmittance. A response time was expressed in terms of time required for a change from 90% transmittance to 10% transmittance (fall time; millisecond).

(2) A composition containing a polymerizable compound: A sample was put in a normally black mode PVA device in which a distance (cell gap) between two glass substrates was 3.2 micrometers and a rubbing direction was anti-parallel. The device was sealed with an ultraviolet-curable adhesive. The device was irradiated with ultraviolet light of 25 mW/cm² for 400 seconds while applying a voltage of 15V to the device. An EXECURE4000-D type Mercury-Xenon lamp made from HOYA CANDEO OPTRONICS CORPORATION was used for irradiation of ultraviolet light. A voltage (rectangular waves; 60 Hz, 10 V, 0.5 second) was applied to the device. On the occasion, the device was irradiated with light from a direction perpendicular to the device, and an amount of light transmitted through the device was measured. The maximum amount of light corresponds to 100% transmittance and the minimum amount of light corresponds to 0% transmittance. A response time was expressed in terms of time required for a change from 0% transmittance to 90% transmittance (rise time; millisecond).

(13) Specific resistance (p; measured at 25° C.; Ωcm): Into a vessel equipped with electrodes, 1.0 milliliter of a sample was injected. A direct current voltage (10 V) was applied to the vessel, and a direct current after 10 seconds was measured. Specific resistance was calculated from the following equation:

(specific resistance)={(voltage)×(electric capacity of a vessel)}/{(direct current)×(dielectric constant of vacuum)}.

Synthesis Example 1

Compound (1-2) was prepared according to a method described below:

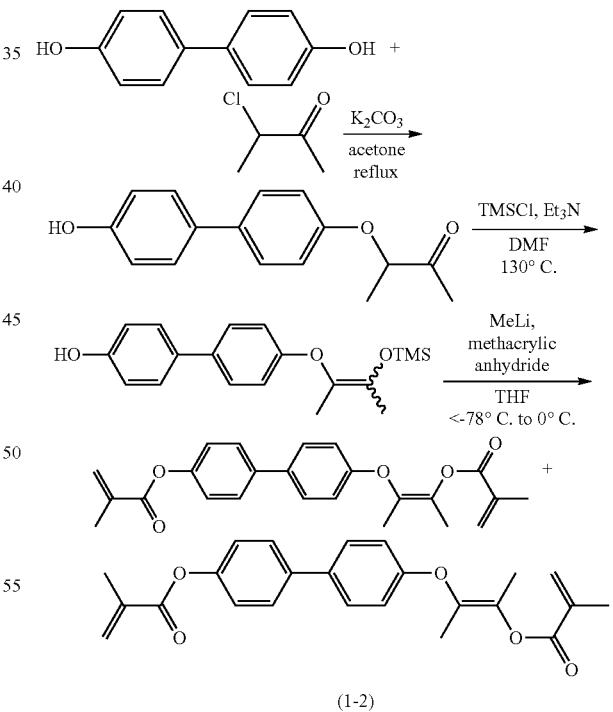

First Step:
A mixture of [1,1'-biphenyl]-4,4'-diol (50.0 g, 269 mmol), potassium carbonate (37.1 g, 269 mmol) and 3-chloro-2-butanone (27.0 mL, 269 mmol) was heated under reflux and stirred for 24 hours in acetone. The resulting reaction mixture was cooled to room temperature, and slowly poured into an aqueous solution of 11% ammonium chloride, and the resulting mixture was subjected to extraction with ethyl acetate. Combined organic layers were washed with water and saturated brine, and dried over anhydrous magnesium sulfate, and then the resulting solution was concentrated under reduced pressure. In the resulting solid, chloroform was put, and the resulting mixture was stirred at room temperature for 30 minutes, and then subjected to suction filtration and the resulting filtrate was concentrated. In the resulting solid, ether and a 1 N sodium hydroxide aqueous solution was put, and the resulting mixture was stirred at room temperature for 10 minutes, and then the resulting solution was separated. An ether layer was subjected to extraction with a 0.1 N sodium hydroxide aqueous solution. Combined aqueous layers were made acidic by using 2 N hydrochloric acid, and subjected to extraction with ether. Combined organic layers were washed with water and saturated brine, and then dried over anhydrous magnesium sulfate, and concentrated under reduced pressure. The resulting solid was recrystallized from hexane-acetone to give 3-((4'-hydroxy-[1,1'-biphenyl]-4-yl)oxy)butane-2-one (7.3 g, yield: 10.6%).

Second Step:

A mixture of 3-((4'-hydroxy-[1,1'-biphenyl]-4-yl)oxy)butane-2-one (7.20 g, 28.2 mmol), triethylamine (20.0 mL, 143.8 mmol) and chlorotrimethylsilane (10.8 mL, 85.2 mmol) was stirred at 130° C. for 24 hours in DMF. The resulting reaction mixture was cooled to room temperature, and slowly poured into a saturated aqueous solution of sodium hydrogencarbonate. The resulting mixture was subjected to extraction with ether. Combined organic layers were washed with a saturated aqueous solution of sodium hydrogencarbonate and saturated brine, and dried over anhydrous magnesium sulfate. A solvent was distilled off under reduced pressure to give 4'-(3-((trimethylsilyl)oxy)-2-butene-2-yl)oxy)-[1,1'-biphenyl]-4-ol (12.8 g, crude yield: >99%). The resulting composition was used for the next reaction as it was without purification.

Third Step:

To a THF solution of the crude product (12.8 g) obtained in the second step, methyllithium (1.13 M in a diethyl ether solution, 60 mL, 67.8 mmol) was slowly added dropwise at −78° C. The resulting reaction mixture was stirred at 0° C. for 30 minutes. After the resulting mixture was cooled to −78° C. again, methacrylic acid anhydride (10.5 mL, 70.5 mmol) was slowly added dropwise thereto. The resulting reaction mixture was warmed to 0° C., and poured into water. The resulting mixture was subjected to extraction with ethyl acetate. Combined organic layers were washed with water, a saturated aqueous solution of sodium hydrogencarbonate and saturated brine, and dried over anhydrous magnesium sulfate, and then concentrated under reduced pressure. The resulting solid was purified by a medium-pressure chromatography column to give (E)-3-((4'-(methacryloyloxy)-[1,1'-biphenyl]-4-yl)oxy)-2-butene-2-yl methacrylate (2.64 g, yield: 24% (in two steps)), and (Z)-3-((4'-(methacryloyloxy)-[1,1'-biphenyl]-4-yl)oxy)-2-butene-2-yl methacrylate (692 mg, yield: <6% (in two steps)).

The compounds described in Comparative Examples and Examples were described using symbols according to definitions in Table 3 below. In Table 3, the configuration of 1,4-cyclohexylene is trans. A parenthesized number next to a symbolized compound corresponds to the number of the compound. A symbol (−) means any other liquid crystal compound. A proportion (percentage) of the liquid crystal compound is expressed in terms of weight percent (% by weight) based on the weight of the liquid crystal composition containing no additive.

TABLE 3

Method for Description of Compounds using Symbols
R—(A$_1$)—Z$_1$— . . . —Z$_n$—(A$_n$)—R'

| 1) Left-terminal Group R— | Symbol |
|---|---|
| F—C$_n$H$_{2n}$— | Fn- |
| C$_n$H$_{2n+1}$— | n- |
| C$_n$H$_{2n+1}$O— | nO- |
| C$_m$H$_{2m+1}$OC$_n$H$_{2n}$— | mOn- |
| CH$_2$=CH— | V- |
| C$_n$H$_{2n+1}$—CH=CH— | nV- |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF- |
| CF$_2$=CH—C$_n$H$_{2n}$— | VFFn- |
| CH$_2$=CH—COO— | AC- |
| CH$_2$=C(CH$_3$)—COO— | MAC- |

| 2) Right-terminal Group —R' | Symbol |
|---|---|
| —C$_n$H$_{2n+1}$ | -n |
| —OC$_n$H$_{2n+1}$ | -On |
| —CH=CH$_2$ | -V |
| —CH=CH—C$_n$H$_{2n+1}$ | -Vn |
| —C$_n$H$_{2n}$—CH=CH$_2$ | -nV |
| —C$_m$H$_{2m}$—CH=CH—C$_n$H$_{2n+1}$ | -mVn |
| —CH=CF$_2$ | -VFF |
| —OCO—CH=CH$_2$ | -AC |
| —OCO—C(CH$_3$)=CH$_2$ | -MAC |

| 3) Bonding Group —Z$_n$— | Symbol |
|---|---|
| —C$_n$H$_{2n}$— | n |
| —COO— | E |
| —CH=CH— | V |
| —CH=CHO— | VO |
| —OCH=CH— | OV |
| —CH$_2$O— | 1O |
| —OCH$_2$— | O1 |

| 4) Ring —A$_n$— | Symbol |
|---|---|
| 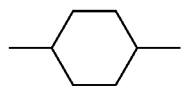 | H |
| 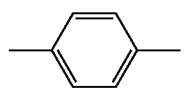 | B |
| 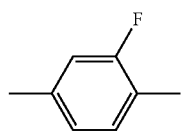 | B(F) |
| 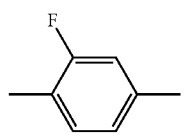 | B(2F) |
| 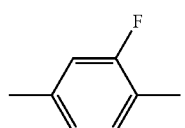 | B(F,F) |

TABLE 3-continued

Method for Description of Compounds using Symbols
R—(A₁)—Z₁— ... —Zₙ—(Aₙ)—R'

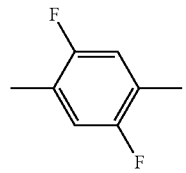 B(2F,5F)

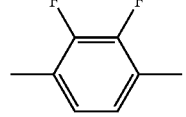 B(2F,3F)

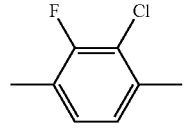 B(2F,3CL)

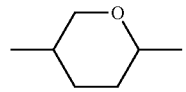 dh

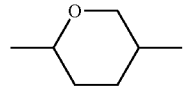 Dh

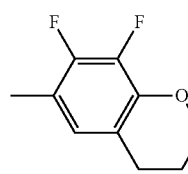 ch

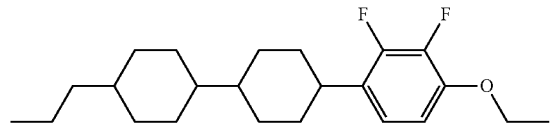 [SMILES: CCCC1CCC(C2CCC(c3ccc(OCC)c(F)c3F)CC2)CC1] Cro(7F,8F)

5) Examples of Description

Example 1. 3-HHB(2F,3F)-O2

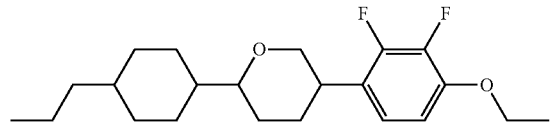 [SMILES: CCCC1CCC(C2CCC(c3ccc(OCC)c(F)c3F)CO2)CC1]

Example 2. 3-HDhB(2F,3F)-O2

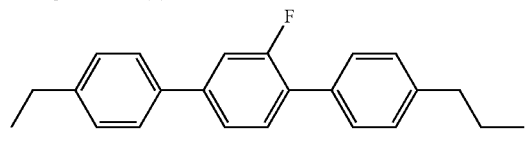 [SMILES: CCCc1ccc(-c2ccc(-c3ccc(CC)cc3)cc2F)cc1]

Example 3. 2-BB(F)B-3

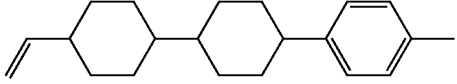

TABLE 3-continued

Method for Description of Compounds using Symbols
R—(A₁)—Z₁— ... —Zₙ—(Aₙ)—R'

Example 4. V-HHB-1

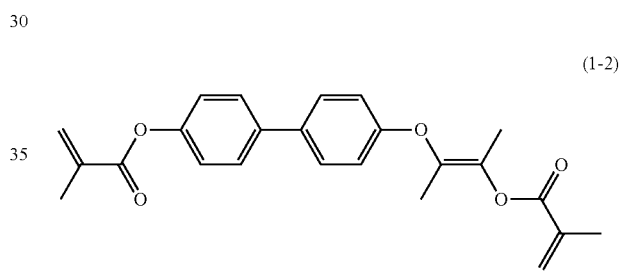

Example 1

| | | |
|---|---|---|
| 3-HH-V | (2-1) | 27% |
| 3-HH-V1 | (2-1) | 9% |
| 3-HHB-O1 | (2-5) | 3% |
| V-HHB-1 | (2-5) | 4% |
| 3-H1OB(2F,3F)-O2 | (3-3) | 4% |
| V2-BB(2F,3F)-O1 | (3-4) | 5% |
| V2-BB(2F,3F)-O2 | (3-4) | 9% |
| 1V2-BB(2F,3F)-O2 | (3-4) | 6% |
| V-HHB(2F,3F)-O1 | (3-6) | 3% |
| V-HHB(2F,3F)-O2 | (3-6) | 10% |
| 3-HH1OB(2F,3F)-O2 | (3-8) | 11% |
| 2-BB(2F,3F)B-3 | (3-9) | 9% |

To the composition, compound (1-2) was added at a proportion of 1.0% by weight.

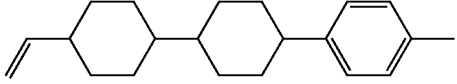
(1-2)

NI=75.6° C.; Tc<−20° C.; $\Delta n$=0.111; $\Delta\varepsilon$=−3.1; Vth=2.30 V.

Photopolymerization was performed by irradiation with ultraviolet light, and then a response time was measured: $\tau$=4.0 ms.

Comparative Example 1

A response time of the composition before adding compound (1-2) in Example 1 to the composition was measured: $\tau$=5.6 ms.

Example 2

| | | |
|---|---|---|
| 3-HH-V | (2-1) | 26% |
| 1-HH-2V1 | (2-1) | 5% |
| 5-HB-O2 | (2-2) | 4% |
| 3-HHB-O1 | (2-5) | 5% |
| V-HHB-1 | (2-5) | 4% |
| 3-H1OB(2F,3F)-O2 | (3-3) | 8% |
| V2-BB(2F,3F)-O1 | (3-4) | 5% |
| V2-BB(2F,3F)-O2 | (3-4) | 9% |
| 1V2-BB(2F,3F)-O4 | (3-4) | 6% |

-continued

| | | |
|---|---|---|
| V-HHB(2F,3F)-O2 | (3-6) | 10% |
| V-HHB(2F,3F)-O4 | (3-6) | 3% |
| 1V2-HHB(2F,3F)-O2 | (3-6) | 4% |
| 3-HH1OB(2F,3F)B-O2 | (3-8) | 11% |

To the composition, compound (1-2) was added at a proportion of 0.3% by weight.

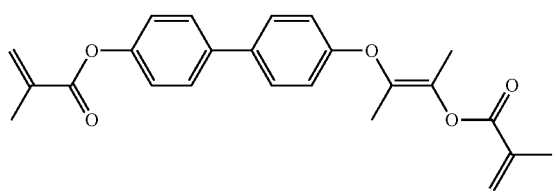
(1-2)

NI=74.0° C.; Tc<−20° C.; Δn=0.101; Δε=−3.4; Vth=2.18 V.

Photopolymerization was performed by irradiation with ultraviolet light, and then a response time was measured: τ=4.4 ms.

Example 3

| | | |
|---|---|---|
| 2-HH-3 | (2-1) | 19% |
| 3-HH-4 | (2-1) | 4% |
| 3-HH-V | (2-1) | 8% |
| V2-BB-1 | (2-3) | 3% |
| 1-BB-3 | (2-3) | 6% |
| V-HHB-3 | (2-5) | 5% |
| 3-HBB-2 | (2-6) | 4% |
| 5-B(F)BB-2 | (2-8) | 3% |
| 5-HBBH-3 | (2) | 3% |
| 3-BB(2F,3F)-O2 | (3-4) | 9% |
| 2O-BB(2F,3F)-O2 | (3-4) | 3% |
| 2-HH1OB(2F,3F)-O2 | (3-8) | 10% |
| 3-HH1OB(2F,3F)-O2 | (3-8) | 20% |
| 2-BB(2F,3F)B-4 | (3-9) | 3% |

To the composition, compound (1-2) was added at a proportion of 0.3% by weight.

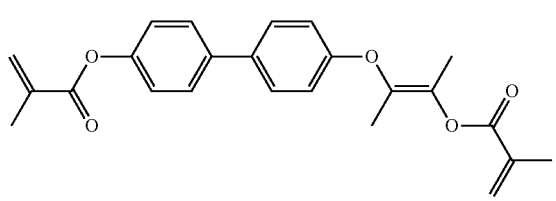
(1-2)

NI=83.6° C.; Tc<−20° C.; Δn=0.108; Δε=−2.8; Vth=2.34 V.

Photopolymerization was performed by irradiation with ultraviolet light, and then a response time was measured: τ=3.7 ms.

Example 4

| | | |
|---|---|---|
| 2-HH-3 | (2-1) | 21% |
| 3-HH-V | (2-1) | 8% |
| 1-BB-3 | (2-3) | 8% |
| 1V2-BB-1 | (2-3) | 3% |
| V2-HHB-2 | (2-5) | 5% |
| 3-HBB-2 | (2-6) | 4% |
| 5-B(F)BB-3 | (2-8) | 3% |
| 3-BB(2F,3F)-O2 | (3-4) | 10% |
| 5-BB(2F,3F)-O4 | (3-4) | 3% |
| 2-HH1OB(2F,3F)-O2 | (3-8) | 10% |
| 3-HH1OB(2F,3F)-O2 | (3-8) | 22% |
| 1O1-HBBH-4 | (—) | 3% |

To the composition, compound (1-2) and compound (4-1) were added at a proportions of 0.3% by weight and a proportion of 0.2% by weight, respectively.

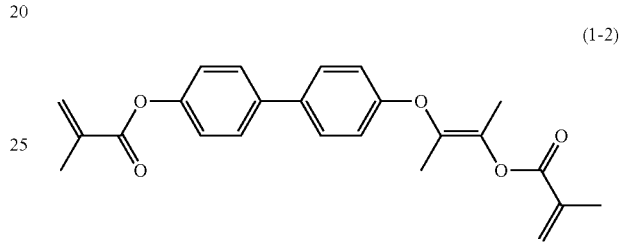
(1-2)

MAC-B(2F)B-MAC (4-1)

NI=78.6° C.; $T_c$<−20° C.; Δn=0.107; Δε=−2.6; Vth=2.39 V.

Photopolymerization was performed by irradiation with ultraviolet light, and then a response time was measured: τ=3.8 ms.

Example 5

| | | |
|---|---|---|
| 3-HH-V | (2-1) | 30% |
| 1-BB-3 | (2-3) | 6% |
| V-HHB-1 | (2-5) | 5% |
| 1-BB(F)B-2V | (2-7) | 3% |
| 3-HHEBH-4 | (2-11) | 3% |
| V2-BB(2F,3F)-O2 | (3-4) | 12% |
| 1V2-BB(2F,3F)-O2 | (3-4) | 6% |
| 1V2-BB(2F,3F)-O4 | (3-4) | 3% |
| V-HHB(2F,3F)-O1 | (3-6) | 6% |
| V-HHB(2F,3F)-O2 | (3-6) | 12% |
| V-HHB(2F,3F)-O4 | (3-6) | 5% |
| 3-HDhB(2F,3F)-O2 | (3-16) | 5% |
| 3-dhBB(2F,3F)-O2 | (3-17) | 4% |

To the composition, compound (1-18) was added at a proportion of 0.5% by weight.

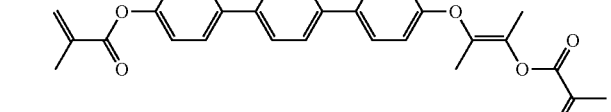
(1-18)

NI=77.4° C.; Tc<−20° C.; Δn=0.112; Δε=−2.9; Vth=2.31 V.

Photopolymerization was performed by irradiation with ultraviolet light, and then a response time was measured: τ=4.4 ms.

Example 6

| | | |
|---|---|---|
| 3-HH-V | (2-1) | 29% |
| V2-HB-1 | (2-2) | 6% |
| V-HHB-1 | (2-5) | 5% |
| 2-BB(F)B-5 | (2-7) | 3% |
| 5-HBB(F)B-3 | (2-13) | 3% |
| V2-BB(2F,3F)-O2 | (3-4) | 12% |
| 1V2-BB(2F,3F)-O2 | (3-4) | 6% |
| 1V2-BB(2F,3F)-O4 | (3-4) | 3% |
| V-HHB(2F,3F)-O1 | (3-6) | 6% |
| V-HHB(2F,3F)-O2 | (3-6) | 7% |
| V-HHB(2F,3F)-O4 | (3-6) | 5% |
| 1V2-HHB(2F,3F)-O4 | (3-6) | 5% |
| 3-HDhB(2F,3F)-O2 | (3-16) | 5% |
| 3-dhBB(2F,3F)-O2 | (3-17) | 5% |

To the composition, compound (1-2) was added at a proportion of 0.3% by weight.

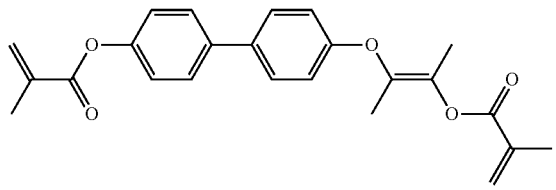

(1-2)

NI=79.0° C.; Tc<−20° C.; Δn=0.112; Δε=−2.9; Vth=2.36 V.

Photopolymerization was performed by irradiation with ultraviolet light, and then a response time was measured: τ=4.4 ms.

Example 7

| | | |
|---|---|---|
| 5-HH-O1 | (2-1) | 4% |
| 3-HH-V | (2-1) | 25% |
| 3-HH-VFF | (2-1) | 3% |
| 1-BB-3 | (2-3) | 6% |
| 3-HHEH-3 | (2-4) | 3% |
| V-HHB-1 | (2-5) | 6% |
| V2-HHB-1 | (2-5) | 3% |
| 3-HB(2F,3F)-O2 | (3-1) | 3% |
| V2-BB(2F,3F)-O2 | (3-4) | 11% |
| 1V2-BB(2F,3F)-O2 | (3-4) | 6% |
| V2-HHB(2F,3F)-O2 | (3-6) | 5% |
| 3-HDhB(2F,3F)-O2 | (3-16) | 5% |
| 3-HBB(2F,3F)-O2 | (3-10) | 3% |
| V-HBB(2F,3F)-O2 | (3-10) | 6% |
| V2-HBB(2F,3F)-O2 | (3-10) | 6% |
| 3-dhBB(2F,3F)-O2 | (3-17) | 5% |

To the composition, compound (1-18) was added at a proportion of 0.3% by weight.

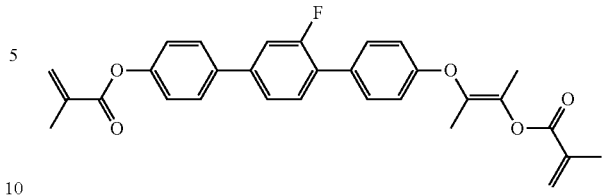

(1-18)

NI=75.3° C.; Tc<−20° C.; Δn=0.113; Δε=−2.5; Vth=2.39 V.

Photopolymerization was performed by irradiation with ultraviolet light, and then a response time was measured: τ=4.5 ms.

Example 8

| | | |
|---|---|---|
| 3-HH-V | (2-1) | 29% |
| 1-BB-3 | (2-3) | 6% |
| V-HHB-1 | (2-5) | 7% |
| 3-HBB-2 | (2-6) | 4% |
| V2-BB(2F,3F)-O2 | (3-4) | 10% |
| 1V2-BB(2F,3F)-O2 | (3-4) | 4% |
| 1V2-BB(2F,3F)-O4 | (3-4) | 4% |
| V-HHB(2F,3F)-O1 | (3-6) | 6% |
| V-HHB(2F,3F)-O2 | (3-6) | 10% |
| V-HHB(2F,3F)-O4 | (3-6) | 5% |
| 3-DhH1OB(2F,3F)-O2 | (3) | 3% |
| 3-HHB(2F,3CL)-O2 | (3-12) | 3% |
| 5-HBB(2F,3CL)-O2 | (3-13) | 3% |
| 3-H1OCro(7F,8F)-5 | (3-14) | 3% |
| 3-HH1OCro(7F,8F)-5 | (3-15) | 3% |

To the composition, compound (1-2) was added at a proportion of 0.3% by weight.

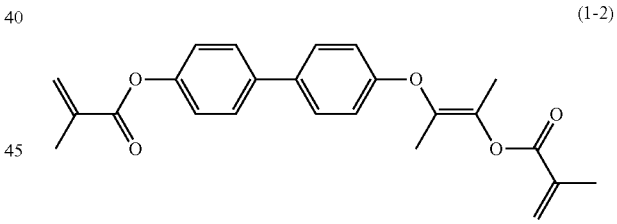

(1-2)

NI=74.5° C.; Tc<−20° C.; Δn=0.105; Δε=−3.0; Vth=2.22 V.

Photopolymerization was performed by irradiation with ultraviolet light, and then a response time was measured: τ=4.9 ms.

Example 9

| | | |
|---|---|---|
| 2-HH-3 | (2-1) | 25% |
| 3-HH-4 | (2-1) | 6% |
| 1-BB-3 | (2-3) | 9% |
| 3-HHB-1 | (2-5) | 3% |
| 3-B(F)BB-2 | (2-8) | 3% |
| 3-HB(F)HH-5 | (2-10) | 3% |
| 3-HB(F)BH-3 | (2-12) | 3% |
| V2-HB(2F,3F)-O2 | (3-1) | 5% |
| 3-H2B(2F,3F)-O2 | (3-2) | 9% |

-continued

| | | |
|---|---|---|
| V-HHB(2F,3F)-O2 | (3-6) | 12% |
| 2-HH1OB(2F,3F)-O2 | (3-8) | 7% |
| 3-HH1OB(2F,3F)-O2 | (3-8) | 12% |
| 3-HDhB(2F,3F)-O2 | (3-16) | 3% |

To the composition, compound (1-18) was added at a proportion of 0.3% by weight.

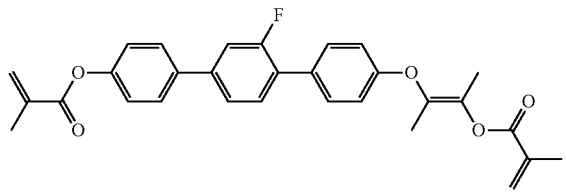

(1-18)

NI=80.1° C.; Tc<−20° C.; Δn=0.092; Δε=−2.9; Vth=2.32 V.

Photopolymerization was performed by irradiation with ultraviolet light, and then a response time was measured: τ=3.9 ms.

Example 10

| | | |
|---|---|---|
| 2-HH-3 | (2-1) | 22% |
| 3-HH-V | (2-1) | 8% |
| 1-BB-3 | (2-3) | 10% |
| 3-HHB-1 | (2-5) | 3% |
| 3-HB(F)HH-5 | (2-10) | 3% |
| 3-HB(F)BH-3 | (2-12) | 3% |
| 1V2-HB(2F,3F)-O2 | (3-1) | 5% |
| 5-H2B(2F,3F)-O2 | (3-2) | 9% |
| 5-HHB(2F,3F)-O2 | (3-6) | 3% |
| V-HHB(2F,3F)-O2 | (3-6) | 6% |
| 2-HH1OB(2F,3F)-O2 | (3-8) | 7% |
| 3-HH1OB(2F,3F)-O2 | (3-8) | 12% |
| 2-BB(2F,3CL)-3 | (3-9) | 3% |
| 2-HHB(2F,3CL)-O2 | (3-12) | 3% |
| 4-HHB(2F,3CL)-O2 | (3-12) | 3% |

To the composition, compound (1-1) was added at a proportion of 0.3% by weight.

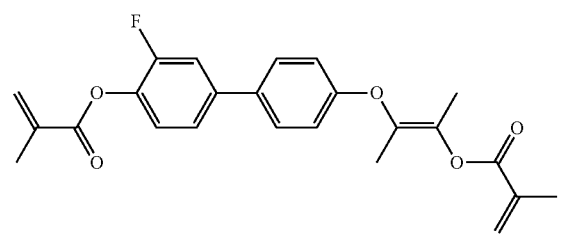

(1-1)

NI=80.5° C.; Tc<−20° C.; Δn=0.093; Δε=−2.9; Vth=2.32 V.

Photopolymerization was performed by irradiation with ultraviolet light, and then a response time was measured: τ=4.2 ms.

Example 11

| | | |
|---|---|---|
| 3-HH-V | (2-1) | 27% |
| 4-HH-V1 | (2-1) | 6% |
| 3-HH-2V1 | (2-1) | 3% |
| 3-HBB-2 | (2-6) | 7% |
| 5-HBB(F)-2 | (2-13) | 3% |
| 3-HB(2F,3F)-O4 | (3-1) | 5% |
| V-HB(2F,3F)-O2 | (3-1) | 4% |
| V2-BB(2F,3F)-O2 | (3-4) | 7% |
| 1V2-BB(2F,3F)-O2 | (3-4) | 6% |
| 2O-B(2F,3F)B(2F,3F)-O6 | (3-5) | 3% |
| V-HHB(2F,3F)-O2 | (3-6) | 10% |
| 3-HH2B(2F,3F)-O2 | (3-7) | 3% |
| 3-HH1OB(2F,3F)-O2 | (3-8) | 10% |
| 2-BB(2F,3F)B-3 | (3-9) | 6% |

To the composition, compound (1-2) was added at a proportion of 0.3% by weight.

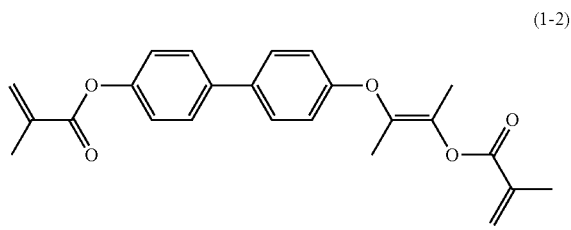 [SMILES: C=C(C)C(=O)O/C(C)=C(\C)Oc1ccc(-c2ccc(OC(=O)C(=C)C)cc2)cc1]

(1-2)

NI=79.2° C.; Tc<−20° C.; Δn=0.112; Δε=−3.1; Vth=2.29 V.

Photopolymerization was performed by irradiation with ultraviolet light, and then a response time was measured: τ=4.3 ms.

Example 12

| | | |
|---|---|---|
| 3-HH-O1 | (2-1) | 3% |
| 3-HH-V | (2-1) | 24% |
| 3-HB-O2 | (2-2) | 3% |
| V-HHB-1 | (2-5) | 7% |
| 3-BB(F)B-5 | (2-7) | 3% |
| 5-HBB(F)-2 | (2-13) | 4% |
| 3-HB(2F,3F)-O2 | (3-1) | 5% |
| V-HB(2F,3F)-O4 | (3-1) | 4% |
| 5-BB(2F,3F)-O2 | (3-4) | 6% |
| V2-BB(2F,3F)-O2 | (3-4) | 7% |
| 3-B(2F,3F)B(2F,3F)-O2 | (3-5) | 3% |
| V-HHB(2F,3F)-O2 | (3-6) | 10% |
| 3-HH1OB(2F,3F)-O2 | (3-8) | 10% |
| 2-BB(2F,3F)B-3 | (3-9) | 5% |
| 4-HBB(2F,3F)-O2 | (3-10) | 3% |
| 3-HBB(2F,3CL)-O2 | (3-13) | 3% |

To the composition, compound (1-18) was added at a proportion of 0.3% by weight.

(1-18)

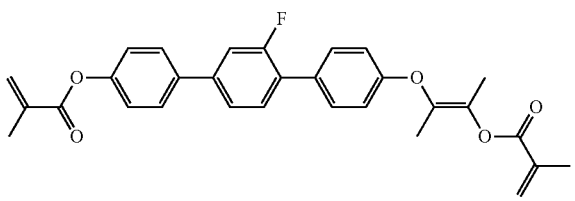

NI=77.7° C.; Tc<−20° C.; Δn=0.117; Δε=−3.1; Vth=2.30 V.

Photopolymerization was performed by irradiation with ultraviolet light, and then a response time was measured: τ=4.8 ms.

Example 13

| | | |
|---|---|---|
| 3-HH-V | (2-1) | 23% |
| 4-HH-V | (2-1) | 3% |
| 5-HH-V | (2-1) | 6% |
| 7-HB-1 | (2-2) | 3% |
| V-HHB-1 | (2-5) | 5% |
| 3-HBB-2 | (2-6) | 3% |
| 2-BB(F)B-3 | (2-7) | 3% |
| 3-BB(2F,3F)-O4 | (3-4) | 5% |
| V2-BB(2F,3F)-O2 | (3-4) | 12% |
| 1V2-BB(2F,3F)-O1 | (3-4) | 4% |
| 3-HHB(2F,3F)-O2 | (3-6) | 5% |
| V-HHB(2F,3F)-O1 | (3-6) | 6% |
| V-HHB(2F,3F)-O2 | (3-6) | 12% |
| 3-DhHB(2F,3F)-O2 | (3) | 5% |
| 3-HEB(2F,3F)B(2F,3F)-O2 | (3-11) | 5% |

To the composition, compound (1-2) was added at a proportion of 0.3% by weight.

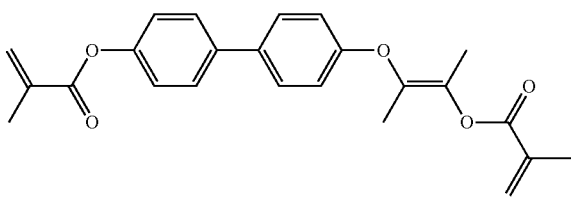
(1-2)

NI=76.3° C.; Tc<−20° C.; Δn=0.104; Δε=−3.0; Vth=2.21 V.

Photopolymerization was performed by irradiation with ultraviolet light, and then a response time was measured: τ=4.5 ms.

Example 14

| | | |
|---|---|---|
| 5-HH-V | (2-1) | 18% |
| 7-HB-1 | (2-2) | 5% |
| V-HHB-1 | (2-5) | 7% |
| V2-HHB-1 | (2-5) | 7% |
| 3-HBB(F)B-3 | (2-13) | 8% |
| 3-HB(2F,3F)-O4 | (3-1) | 15% |
| 3-HBB(2F,3F)-O2 | (3-10) | 8% |
| 4-HBB(2F,3F)-O2 | (3-10) | 5% |
| 5-HBB(2F,3F)-O2 | (3-10) | 7% |
| 3-dhBB(2F,3F)-O2 | (3-17) | 5% |
| 3-chB(2F,3F)-O2 | (3-18) | 7% |
| 2-HchB(2F,3F)-O2 | (3-19) | 8% |

To the composition, compound (1-2) was added at a proportion of 0.3% by weight.

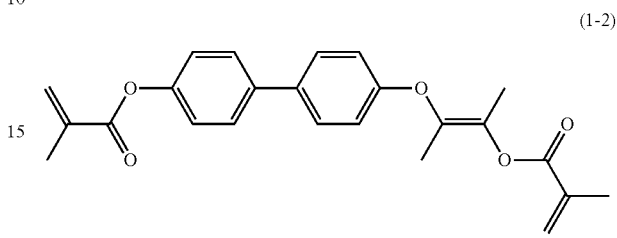
(1-2)

NI=98.8° C.; Tc<−30° C.; Δn=0.111; Δε=−3.2; Vth=2.47 V.

The response time of the composition in Comparative Example 1 was 5.6 milliseconds. On the other hand, the response time of the composition in Example 1 to Example 13 were 3.7 to 4.9 milliseconds. Thus, the PVA device in Examples was found to have a shorter response time than the response time in Comparative Example 1. Accordingly, the composition of the invention is concluded to have superb characteristics in view of the polymer sustained alignment mode liquid crystal display device.

INDUSTRIAL APPLICABILITY

A liquid crystal composition of the invention satisfies at least one of characteristics such as a high maximum temperature, a low minimum temperature, a small viscosity, a suitable optical anisotropy, a large negative dielectric anisotropy, a large specific resistance, a high stability to ultraviolet light and a high stability to heat, or has a suitable balance regarding at least two of the characteristics. A liquid crystal display device including the composition has characteristics such as a short response time, a large voltage holding ratio, a low threshold voltage, a large contrast ratio, a long service life and so forth, and thus can be used for a liquid crystal projector, a liquid crystal television and so forth.

What is claimed is:

1. A liquid crystal composition that has a negative dielectric anisotropy, and contains at least one polymerizable compound selected from the group of compounds represented by formula (1):

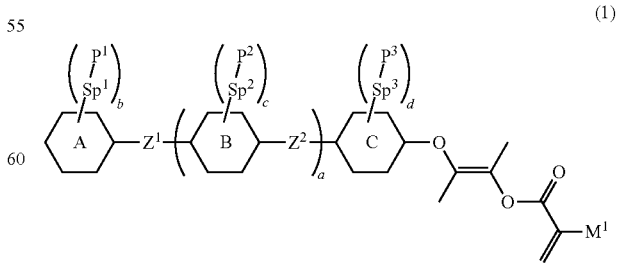
(1)

wherein, in formula (1), ring A is cyclohexyl, cyclohexenyl, phenyl, 1-naphthyl, 2-naphthyl, tetrahydropyran- 2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring B and ring C are independently 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^1$ and $Z^2$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH=CH—, —C($CH_3$)=CH—, —CH=C($CH_3$)— or —C($CH_3$)=C($CH_3$)—, and in the groups, at least one piece of hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or —C≡C—, and in the groups, at least one piece of hydrogen may be replaced by fluorine or chlorine; $M^1$ is hydrogen or methyl; a is 0, 1 or 2; and b, c and d are independently 0, 1, 2, 3 or 4.

2. The liquid crystal composition according to claim 1, wherein, in formula (1), $P^1$, $P^2$ and $P^3$ are independently a polymerizable group selected from the group of groups represented by formula (P-1) to formula (P-5):

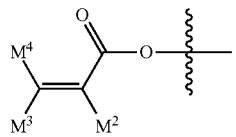

(P-1)

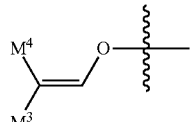

(P-2)

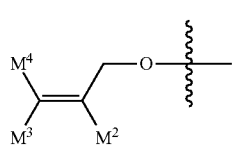

(P-3)

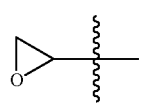

(P-4)

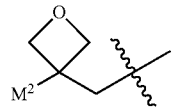

(P-5)

wherein, in formula (P-1) to formula (P-5), $M^2$, $M^3$ and $M^4$ are independently hydrogen, fluorine, alkyl having 1 to 5 carbons, or alkyl having 1 to 5 carbons in which at least one piece of hydrogen is replaced by fluorine or chlorine.

3. The liquid crystal composition according to claim 1, containing at least one polymerizable compound selected from the group of compounds represented by formula (1-1) to formula (1-27):

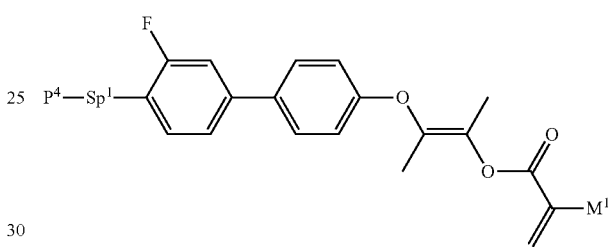

(1-1)

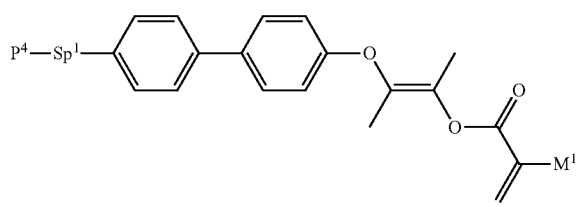

(1-2)

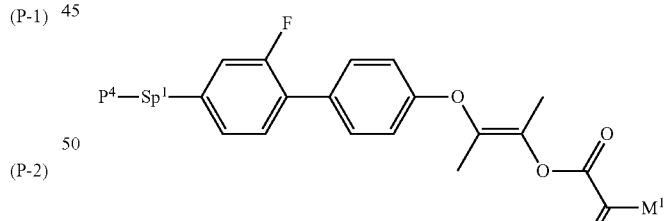

(1-3)

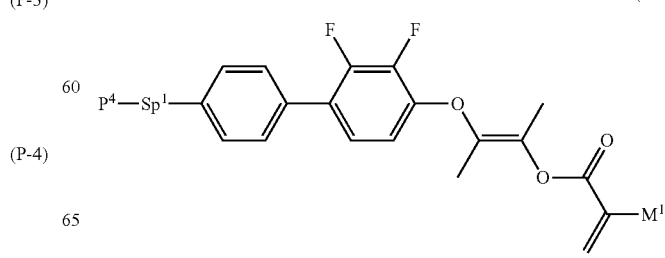

(1-4)

(1-5)
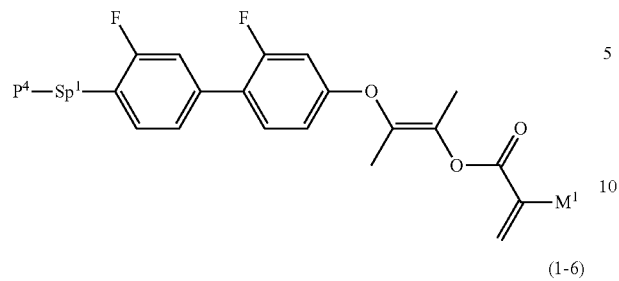
(1-6)
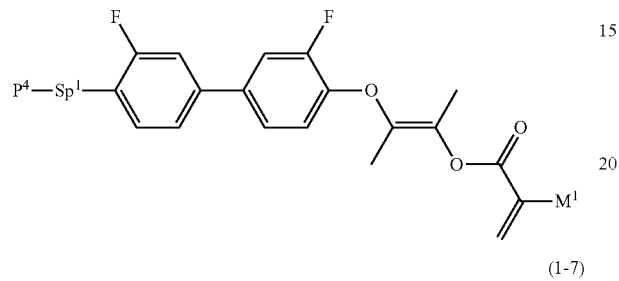
(1-7)
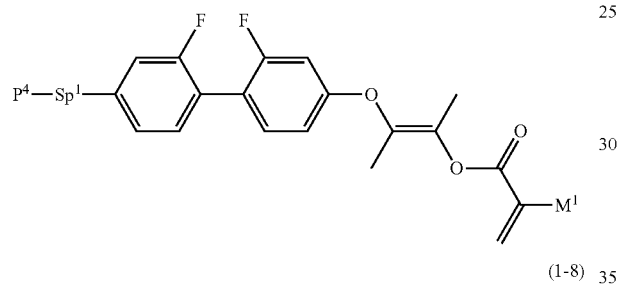
(1-8)
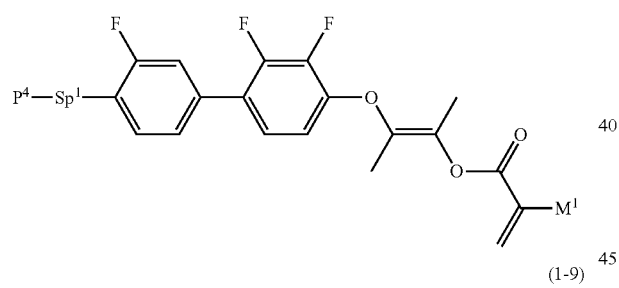
(1-9)
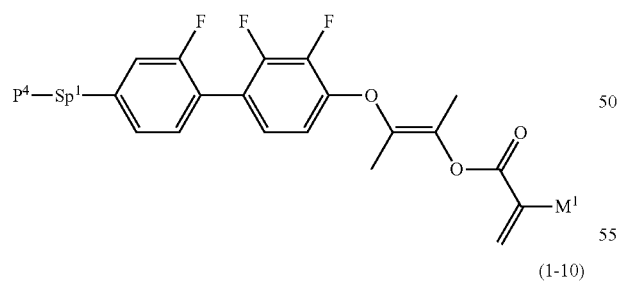
(1-10)
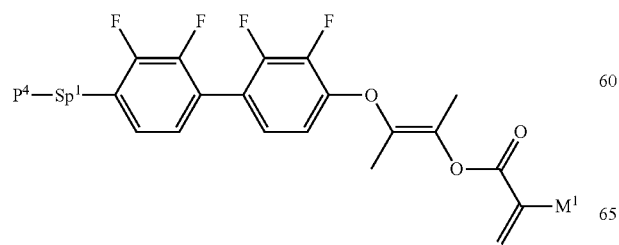
(1-11)
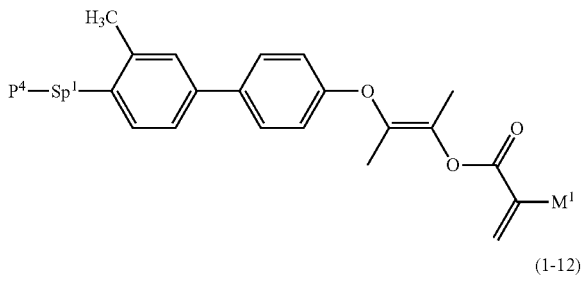
(1-12)
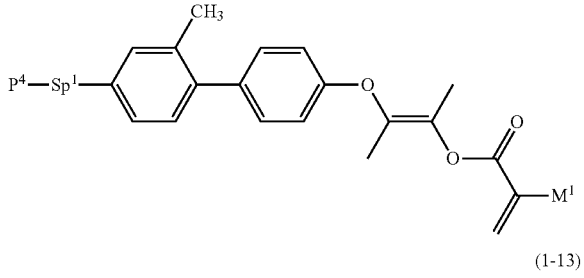
(1-13)
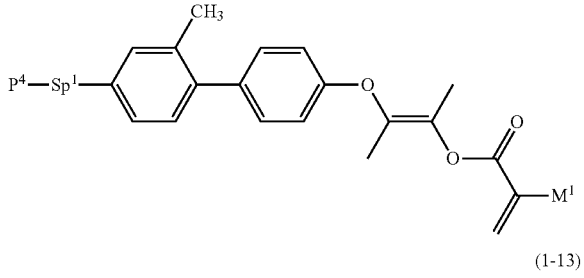
(1-14)
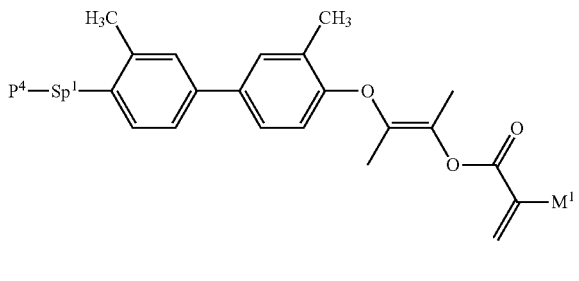
(1-15)
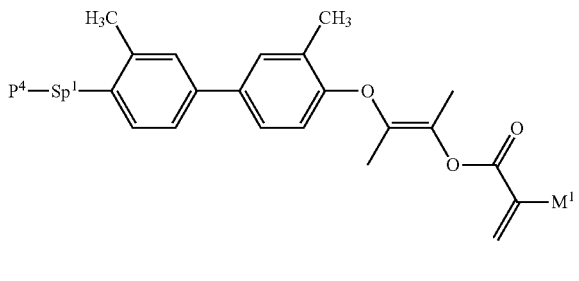
(1-16)
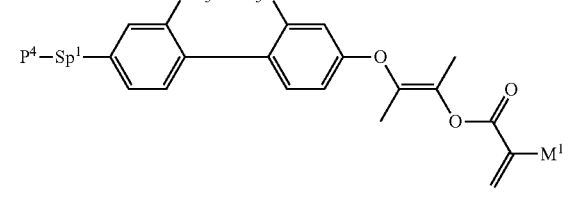

(1-17)
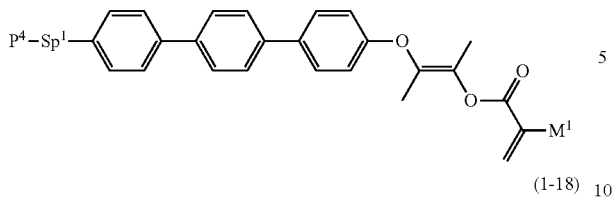
(1-18)
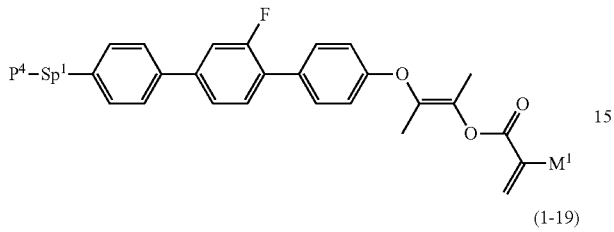
(1-19)
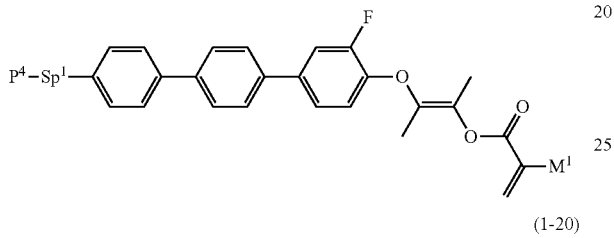
(1-20)
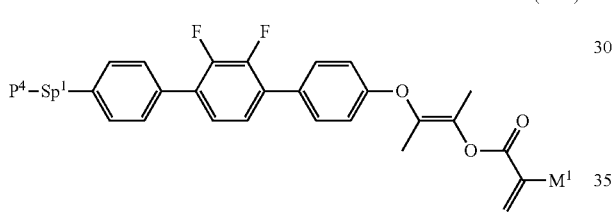
(1-21)
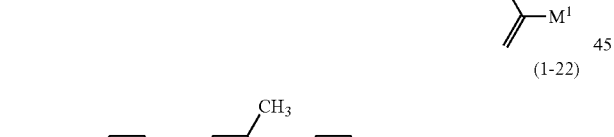
(1-22)
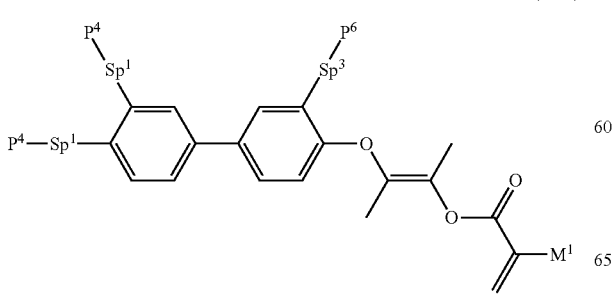
(1-23)
(1-24)
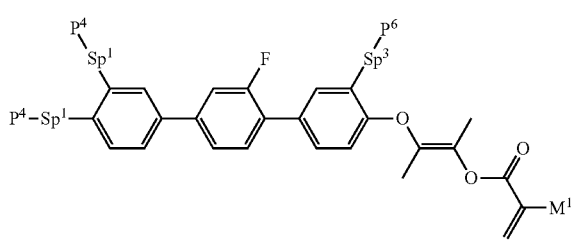
(1-25)
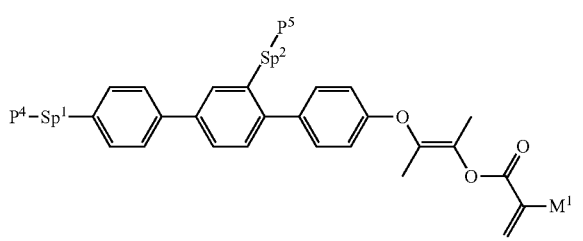
(1-26)
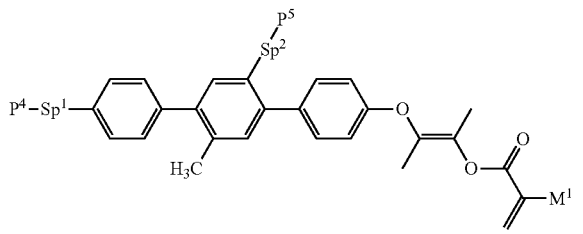
(1-27)
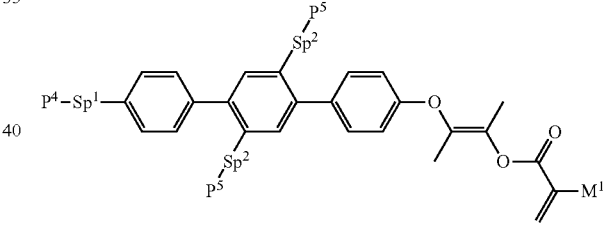
wherein, in formula (1-1) to formula (1-27), $P^4$, $P^5$ and $P^6$ are independently a polymerizable group selected from the group of groups represented by formula (P-1) to formula (P-3);
(P-1)
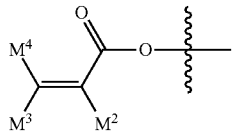
(P-2)
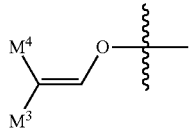

-continued

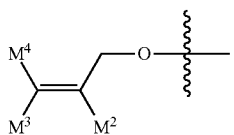
(P-3)

wherein, in formula (P-1) to formula (P-3), $M^2$, $M^3$ and $M^4$ are independently hydrogen, fluorine, alkyl having 1 to 5 carbons, or alkyl having 1 to 5 carbons in which at least one piece of hydrogen is replaced by fluorine or chlorine; and in formula (1-1) to formula (1-27), $Sp^1$, $Sp^2$ and $Sp^3$ are independently a single bond or alkylene having 1 to 10 carbons, and in the alkylene, at least one piece of —CH₂— may be replaced by —O—, —COO—, —OCO— or —OCOO—, and at least one piece of —CH₂—CH₂— may be replaced by —CH═CH— or —C≡C—, and in the groups, at least one piece of hydrogen may be replaced by fluorine or chlorine; and M1 is hydrogen or methyl.

4. The liquid crystal composition according to claim 1, wherein $P^1$, $P^2$ and $P^3$ are independently methacryloyloxy or acryloyloxy, and $Sp^1$, $Sp^2$ and $Sp^3$ are a single bond.

5. The liquid crystal composition according to claim 1, containing at least one compound selected from the group of compounds represented by formula (2) as a first component:

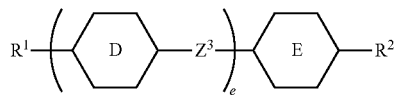
(2)

wherein, in formula (2), $R^1$ and $R^2$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine; ring D and ring E are independently 1,4-cyclohexylene, 1,4-phenylene, 2-fluoro-1,4-phenylene or 2,5-difluoro-1,4-phenylene; $Z^3$ is a single bond, ethylene or carbonyloxy; and e is 1, 2 or 3.

6. The liquid crystal composition according to claim 5, containing at least one compound selected from the group of compounds represented by formula (2-1) to formula (2-13) as the first component:

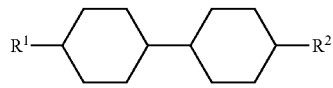
(2-1)

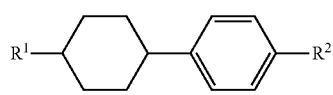
(2-2)

(2-3)

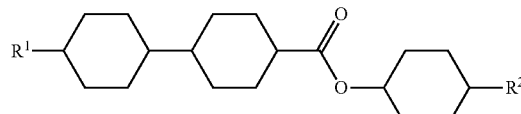
(2-4)

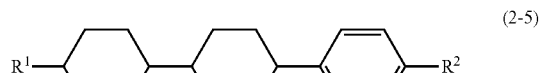
(2-5)

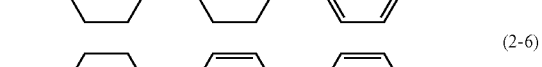
(2-6)

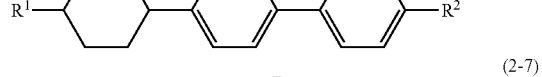
(2-7)

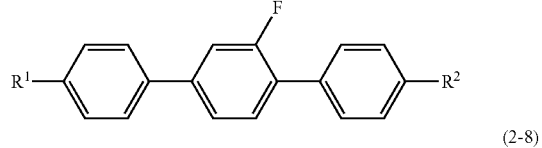
(2-8)

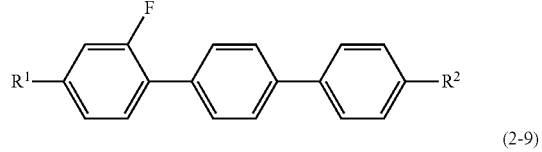
(2-9)

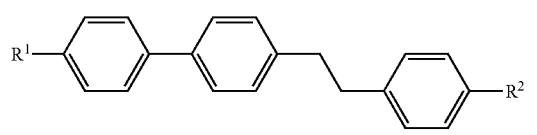
(2-10)

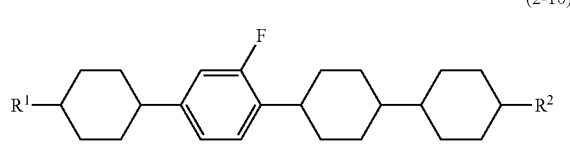
(2-11)

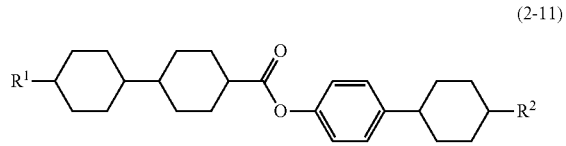
(2-12)

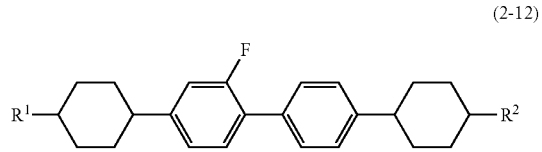
(2-13)

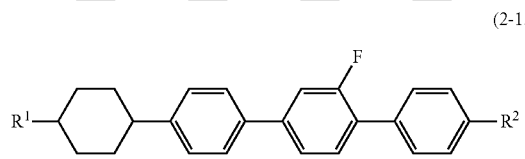

wherein, in formula (2-1) to formula (2-13), $R^1$ and $R^2$ are independently alkyl having 1 to 12 carbons, alkoxy having 1 to 12 carbons, alkenyl having 2 to 12 carbons, alkyl having 1 to 12 carbons in which at least one piece of hydrogen is replaced by fluorine or chlorine, or alkenyl having 2 to 12 carbons in which at least one piece of hydrogen is replaced by fluorine or chlorine.

7. The liquid crystal composition according to claim 5, wherein a proportion of the first component is in the range of 10% by weight to 70% by weight.

8. The liquid crystal composition according to claim 1, containing at least one compound selected from the group of compounds represented by formula (3) as a second component:

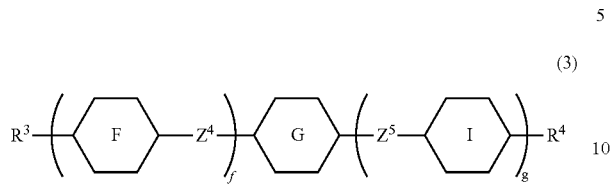
(3)

wherein, in formula (3), $R^3$ and $R^4$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine; ring F and ring I are independently 1,4-cyclohexylene, 1,4-cyclohexenylene, tetrahydropyran-2,5-diyl, 1,4-phenylene, 1,4-phenylene in which at least one piece of hydrogen is replaced by fluorine or chlorine, naphthalene-2,6-diyl, naphthalene-2,6-diyl in which at least one piece of hydrogen is replaced by fluorine or chlorine, chroman-2,6-diyl, or chroman-2,6-diyl in which at least one piece of hydrogen is replaced by fluorine or chlorine; ring G is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^4$ and $Z^5$ are independently a single bond, ethylene, carbonyloxy or methyleneoxy; f is 1, 2 or 3; g is 0 or 1; and a sum of f and g is 3 or less.

9. The liquid crystal composition according to claim 8, containing at least one compound selected from the group of compounds represented by formula (3-1) to formula (3-22) as the second component:

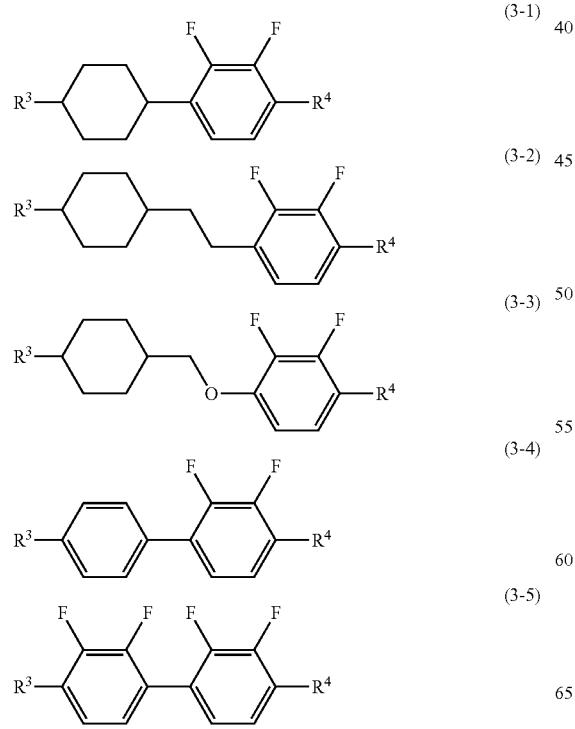

(3-1)
(3-2)
(3-3)
(3-4)
(3-5)

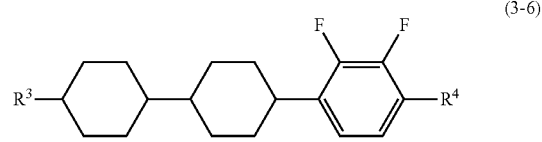
(3-6)

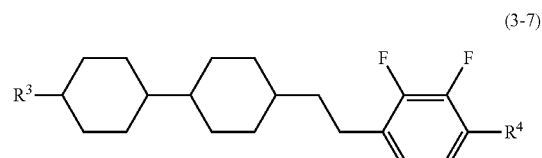
(3-7)

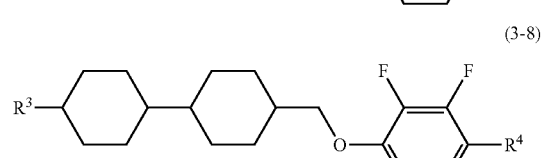
(3-8)

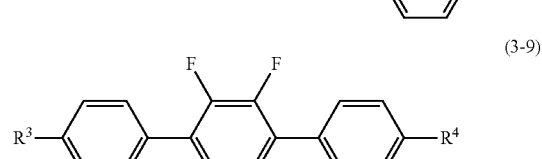
(3-9)

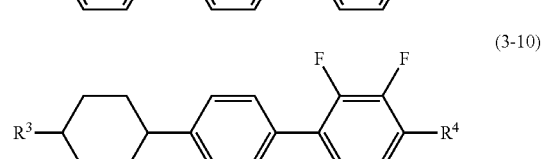
(3-10)

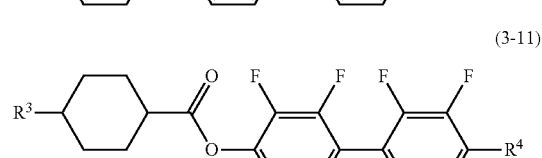
(3-11)

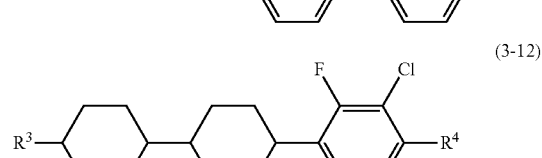
(3-12)

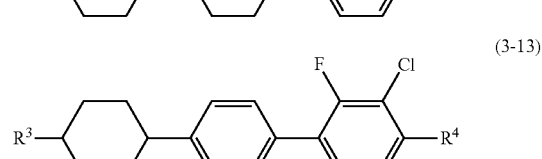
(3-13)

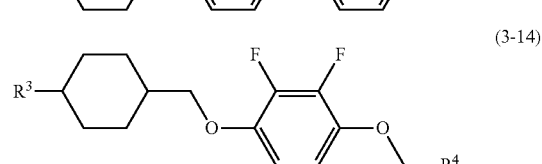
(3-14)

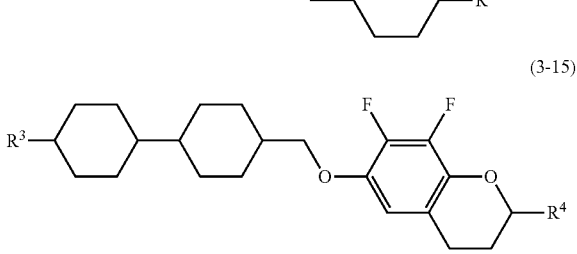
(3-15)

-continued

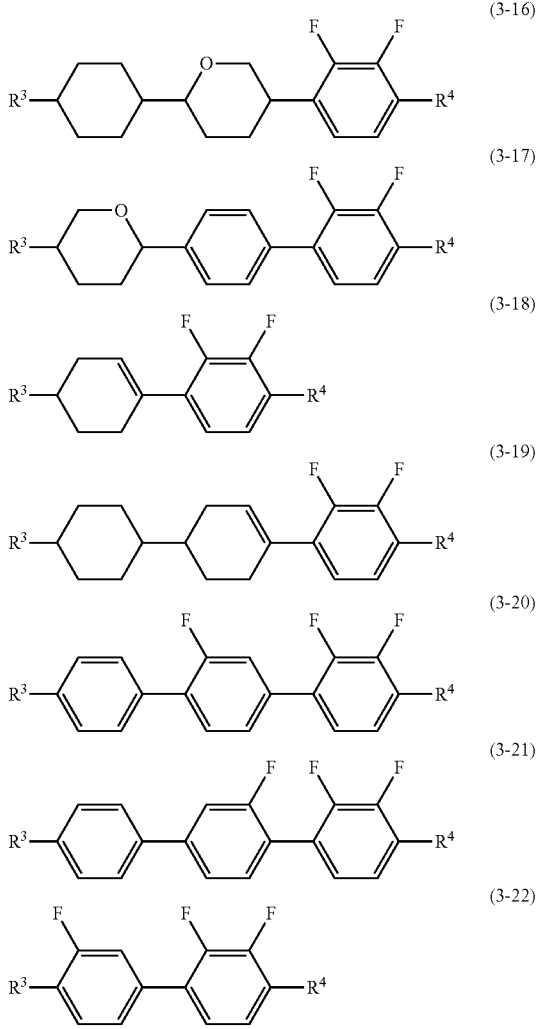

wherein, in formula (3-1) to formula (3-22), $R^3$ and $R^4$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine.

10. The liquid crystal composition according to claim 5, containing at least one compound selected from the group of compounds represented by formula (3) as a second component:

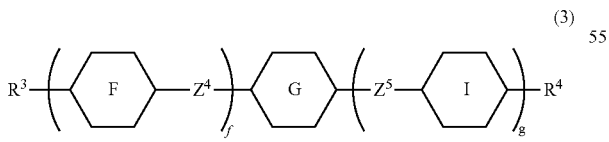

wherein, in formula (3), $R^3$ and $R^4$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one piece of hydrogen is replaced by fluorine or chlorine; ring F and ring I are independently 1,4-cyclohexylene, 1,4-cyclohexenylene, tetrahydropyran- 2,5-diyl, 1,4-phenylene, 1,4-phenylene in which at least one piece of hydrogen is replaced by fluorine or chlorine, naphthalene-2,6-diyl, naphthalene-2,6-diyl in which at least one piece of hydrogen is replaced by fluorine or chlorine, chroman-2,6-diyl, or chroman-2, 6-diyl in which at least one piece of hydrogen is replaced by fluorine or chlorine; ring G is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^4$ and $Z^5$ are independently a single bond, ethylene, carbonyloxy or methyleneoxy; f is 1, 2 or 3; g is 0 or 1; and a sum of f and g is 3 or less.

11. The liquid crystal composition according to claim 8, wherein a proportion of the second component is in the range of 10% by weight to 90% by weight.

12. The liquid crystal composition according to claim 1, further containing at least one polymerizable compound selected from the group of compounds represented by formula (4):

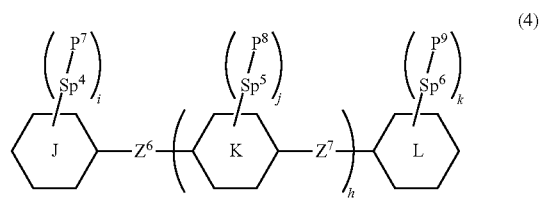

wherein, in formula (4), ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^6$ and $Z^7$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH=CH—, —C($CH_3$)=CH—, —CH=C($CH_3$)— or —C($CH_3$)=C($CH_3$)—, and in the groups, at least one piece of hydrogen may be replaced by fluorine or chlorine; $P^7$, $P^8$ and $P^9$ are independently a polymerizable group; $Sp^4$, $Sp^y$ and $Sp^6$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH=CH— or —C≡C—, and in the groups, at least one piece of hydrogen may be replaced by fluorine or chlorine; h is 0, 1, or 2; i, j and k are independently 0, 1, 2, 3 or 4; and a sum of i, j and k is 1 or more.

13. The liquid crystal composition according to claim 12, wherein, in formula (4), $P^7$, $P^8$ and $P^9$ are independently a polymerizable group selected from the group of groups represented by formula (P-1) to formula (P-5):

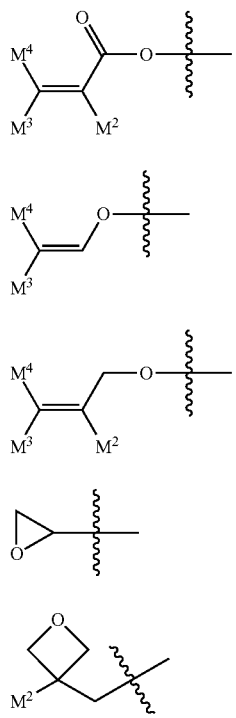

wherein, in formula (P-1) to formula (P-5), $M^2$, $M^3$ and $M^4$ are independently hydrogen, fluorine, alkyl having 1 to 5 carbons, or alkyl having 1 to 5 carbons in which at least one piece of hydrogen is replaced by fluorine or chlorine.

14. The liquid crystal composition according to claim 12, further containing at least one polymerizable compound selected from the group of compounds represented by formula (4-1) to formula (4-27):

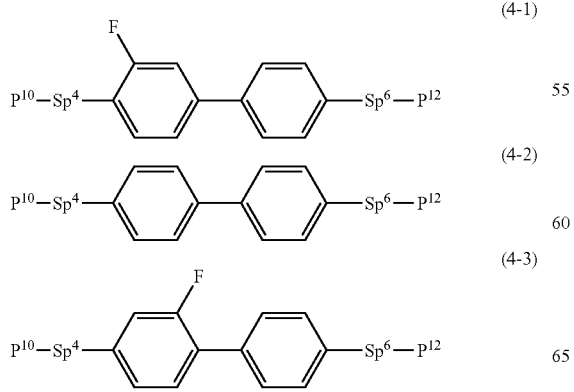

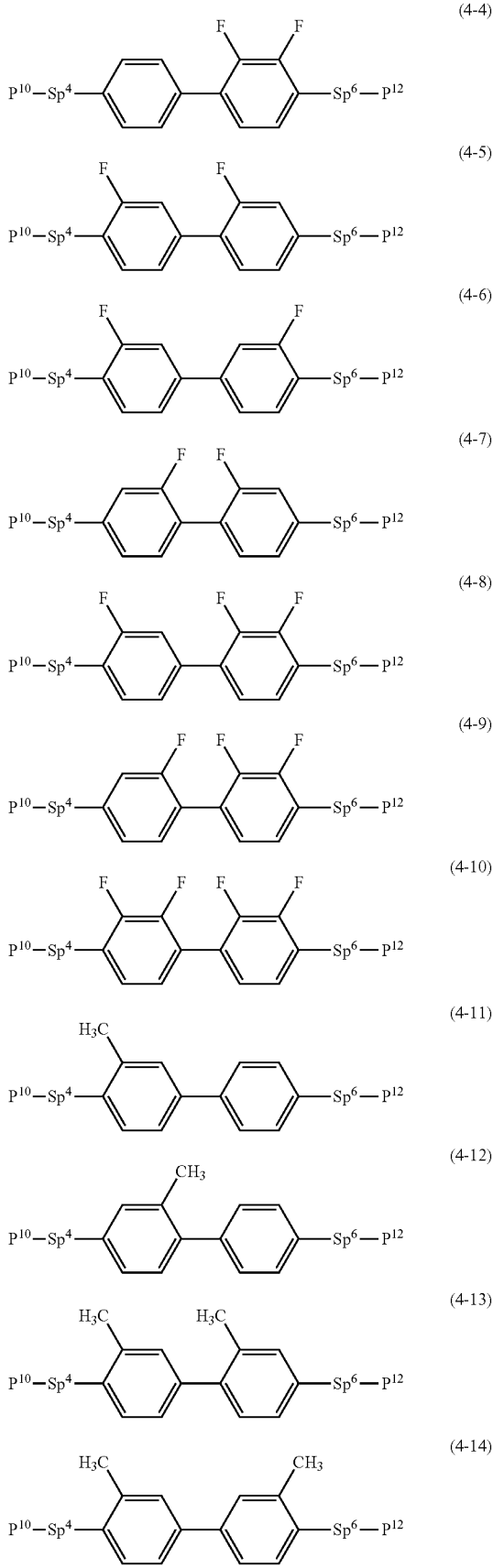

(4-15)
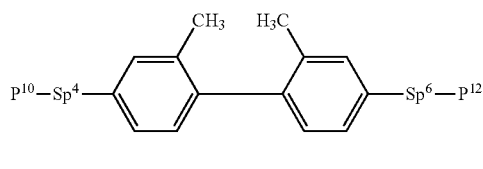
(4-16)
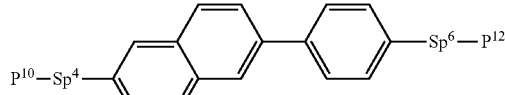
(4-17)
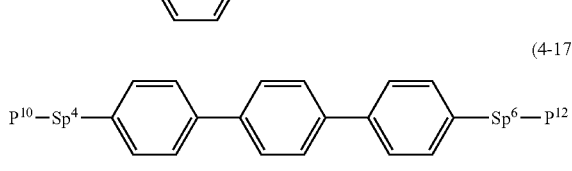
(4-18)
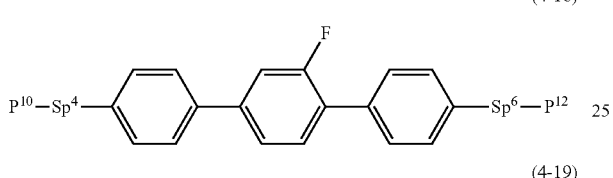
(4-19)
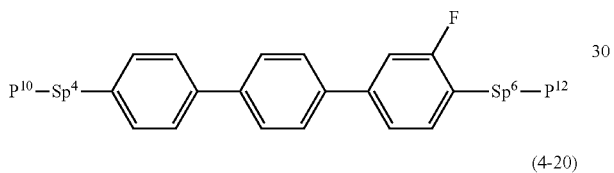
(4-20)
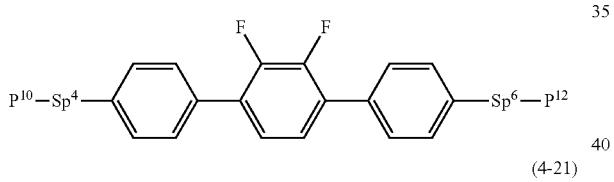
(4-21)
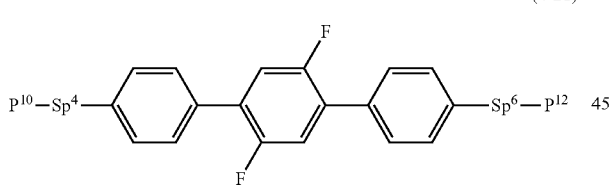
(4-22)
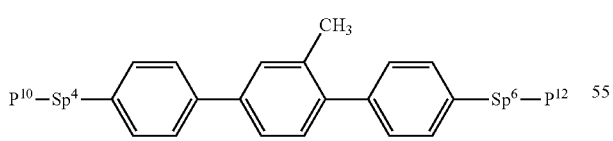
(4-23)
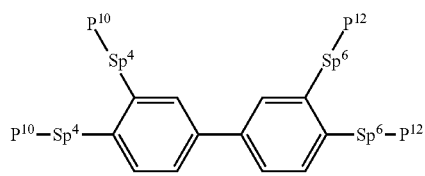
(4-24)
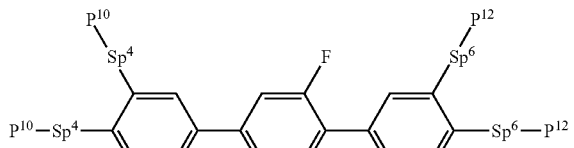
(4-25)
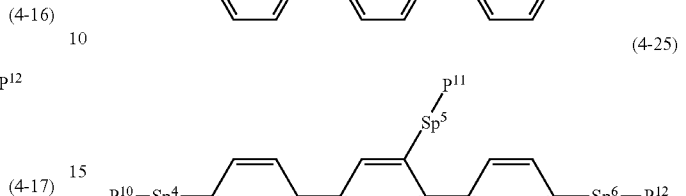
(4-26)
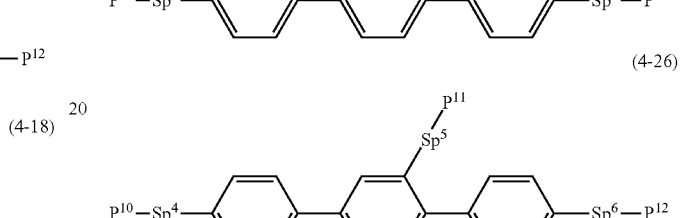
(4-27)
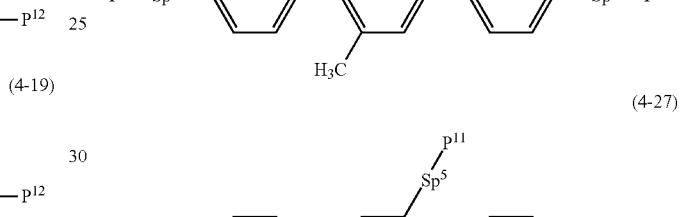
wherein, in formula (4-1) to formula (4-27), $P^{10}$, $P^{11}$ and $P^{12}$ are independently a polymerizable group selected from the group of groups represented by formula (P-1) to formula (P-3);
(P-1)
(P-2)
(P-3)
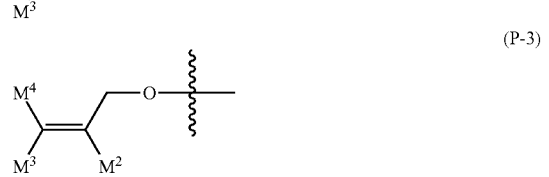
wherein, in formula (P-1) to formula (P-3), $M^2$, $M^3$ and $M^4$ are independently hydrogen, fluorine, alkyl having 1 to 5 carbons, or alkyl having 1 to 5 carbons in which at least one piece of hydrogen is replaced by fluorine or chlorine; and in formula (4-1) to formula (4-27), $Sp^4$, $Sp^y$ and $Sp^6$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH═CH— or —C≡C—, and in the groups, at least one piece of hydrogen may be replaced by fluorine or chlorine.

15. The liquid crystal composition according to claim 5, further containing at least one polymerizable compound selected from the group of compounds represented by formula (4):

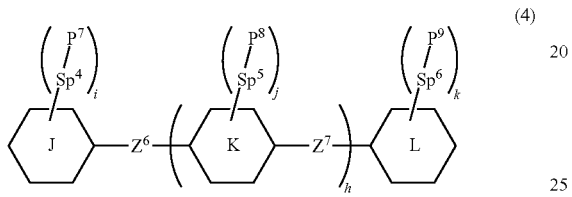

(4)

wherein, in formula (4), ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^6$ and $Z^7$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH═CH—, —C($CH_3$)═CH—, —CH═C($CH_3$)— or —C($CH_3$)═C($CH_3$)—, and in the groups, at least one piece of hydrogen may be replaced by fluorine or chlorine; $P^7$, $P^8$ and $P^9$ are independently a polymerizable group; $Sp^4$, $Sp^y$ and $Sp^6$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH═CH— or —C≡C—, and in the groups, at least one piece of hydrogen may be replaced by fluorine or chlorine; h is 0, 1, or 2; i, j and k are independently 0, 1, 2, 3 or 4; and a sum of i, j and k is 1 or more.

16. The liquid crystal composition according to claim 8, further containing at least one polymerizable compound selected from the group of compounds represented by formula (4):

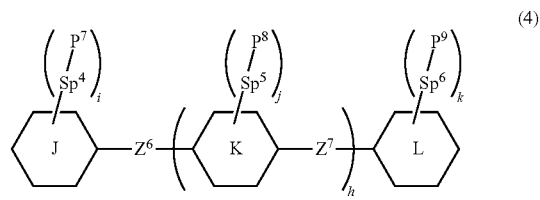

(4)

wherein, in formula (4), ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^6$ and $Z^7$ are independently a single bond or alkylene having 1 to 10 carbons, and in the alkylene, at least one piece of —$CH_2$— may be replaced by —O—, —CO—, —COO— or —OCO—, and at least one piece of —$CH_2$—$CH_2$— may be replaced by —CH═CH—, —C($CH_3$)═CH—, —CH═C($CH_3$)— or —C($CH_3$)═C($CH_3$)—, and in the groups, at least one piece of hydrogen may be replaced by fluorine or chlorine; $P^7$, $P^8$ and $P^9$ are independently a polymerizable group; $Sp^4$, $Sp^y$ and $Sp^6$ are independently a single bond or alkylene having 1 to 10 carbons, and in the alkylene, at least one piece of —$CH_2$— may be replaced by —O—, —COO—, —OCO— or —OCOO—, and at least one piece of —$CH_2$—$CH_2$— may be replaced by —CH═CH— or —C≡C—, and in the groups, at least one piece of hydrogen may be replaced by fluorine or chlorine; h is 0, 1, or 2; i, j and k are independently 0, 1, 2, 3 or 4; and a sum of i, j and k is 1 or more.

17. The liquid crystal composition according to claim 10, further containing at least one polymerizable compound selected from the group of compounds represented by formula (4):

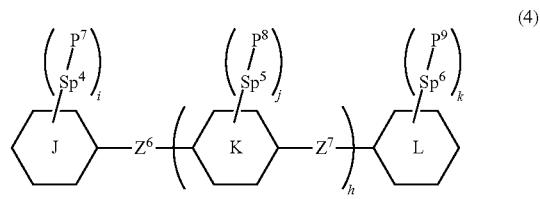

(4)

wherein, in formula (4), ring J and ring L are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; ring K is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one piece of hydrogen may be replaced by fluorine, chlorine, alkyl having 1 to 12 carbons, alkoxy having 1 to 12 carbons, or alkyl having 1 to 12 carbons in which at least one piece of hydrogen is replaced by fluorine or chlorine; $Z^6$ and $Z^7$ are independently a single bond or alkylene having 1 to 10 carbons, and in the alkylene, at least one piece of —CH$_2$— may be replaced by —O—, —CO—, —COO— or —OCO—, and at least one piece of —CH$_2$—CH$_2$— may be replaced by —CH═CH—, —C(CH$_3$)═CH—, —CH═C(CH$_3$)— or —C(CH$_3$)═C(CH$_3$)—, and in the groups, at least one piece of hydrogen may be replaced by fluorine or chlorine; $P^7$, $P^8$ and $P^9$ are independently a polymerizable group; $Sp^4$, $Sp^5$ and $Sp^6$ are independently a single bond or alkylene having 1 to 10 carbons, and in the alkylene, at least one piece of —CH$_2$— may be replaced by —O—, —COO—, —OCO— or —OCOO—, and at least one piece of —CH$_2$—CH$_2$— may be replaced by —CH═CH— or —C≡C—, and in the groups, at least one piece of hydrogen may be replaced by fluorine or chlorine; h is 0, 1, or 2; i, j and k are independently 0, 1, 2, 3 or 4; and a sum of i, j and k is 1 or more.

18. The liquid crystal composition according to claim 12, wherein a proportion of the polymerizable compound is the range of 0.03% by weight to 10% by weight.

19. A polymer sustained alignment mode liquid crystal display device, wherein the liquid crystal display device includes the liquid crystal composition according to claim 1, or the polymerizable compound in the liquid crystal composition is polymerized.

20. The liquid crystal display device according to claim 19, wherein an operating mode in the liquid crystal display device includes an IPS mode, a VA mode, an FFS mode or an FPA mode, and a driving mode in the liquid crystal display device includes an active matrix mode.

* * * * *